(12) United States Patent
Ito et al.

(10) Patent No.: US 10,792,955 B2
(45) Date of Patent: Oct. 6, 2020

(54) PLATE WITH PRINTED LAYER, MANUFACTURING METHOD THEREOF, AND DISPLAY DEVICE

(71) Applicant: AGC Inc., Chiyoda-ku (JP)

(72) Inventors: Jun Ito, Tokyo (JP); Azusa Takai, Tokyo (JP)

(73) Assignee: AGC Inc., Chiyoda-ku (JP)

( * ) Notice: Subject to any disclaimer, the term of this patent is extended or adjusted under 35 U.S.C. 154(b) by 215 days.

(21) Appl. No.: 15/984,878

(22) Filed: May 21, 2018

(65) Prior Publication Data

US 2018/0339546 A1 Nov. 29, 2018

(30) Foreign Application Priority Data

May 23, 2017 (JP) .................. 2017-101359

(51) Int. Cl.
| | | |
|---|---|---|
| *B32B 3/00* | (2006.01) | |
| *B44C 1/10* | (2006.01) | |
| *B41M 3/00* | (2006.01) | |
| *B44C 1/16* | (2006.01) | |
| *B32B 7/12* | (2006.01) | |
| *B60Q 3/10* | (2017.01) | |
| *B32B 15/08* | (2006.01) | |
| *B32B 15/04* | (2006.01) | |
| *B60K 37/02* | (2006.01) | |
| *B44C 5/04* | (2006.01) | |
| *B44C 1/17* | (2006.01) | |

(52) U.S. Cl.
CPC ............. *B44C 1/105* (2013.01); *B32B 7/12* (2013.01); *B32B 15/043* (2013.01); *B32B 15/08* (2013.01); *B41M 3/008* (2013.01); *B44C 1/16* (2013.01); *B44C 5/0407* (2013.01); *B60K 37/02* (2013.01); *B60Q 3/10* (2017.02); *B44C 1/17* (2013.01); *B60K 2370/27* (2019.05); *B60K 2370/339* (2019.05)

(58) Field of Classification Search
CPC ....... B32B 17/00; B44C 1/105; B44C 5/0407; B60Q 3/10; H05K 5/03
See application file for complete search history.

(56) References Cited

U.S. PATENT DOCUMENTS

| | | | | |
|---|---|---|---|---|
| 2008/0218574 | A1* | 9/2008 | Furuno | B41J 2/2146 347/100 |
| 2016/0357294 | A1* | 12/2016 | Ozeki | C03C 15/00 |
| 2017/0341451 | A1* | 11/2017 | Minamidate | B32B 5/142 |
| 2019/0031559 | A1* | 1/2019 | Hori | C03C 17/002 |

FOREIGN PATENT DOCUMENTS

JP 2000-211234 8/2000

* cited by examiner

*Primary Examiner* — Elizabeth E Mulvaney
(74) *Attorney, Agent, or Firm* — Oblon, McClelland, Maier & Neustadt, L.L.P.

(57) ABSTRACT

The present invention relates to a plate with a printed layer, including a plate having a bent portion, a lower printed layer, and an upper printed layer provided at a portion of the lower printed layer, in which at least a portion of the lower printed layer is provided at a position corresponding to the bent portion on a main surface of the plate.

20 Claims, 11 Drawing Sheets

PLATE WITH PRINTED LAYER, MANUFACTURING METHOD THEREOF, AND DISPLAY DEVICE

TECHNICAL FIELD

The present invention relates to a plate with a printed layer, a manufacturing method thereof, and a display device.

BACKGROUND ART

Conventionally, there has been an expression method using a print target plate, a metal base color layer and a design layer (metal base color layer and design layer are collectively referred to as "a printed layer" in some cases). The print target plate has a flat surface which has been smoothly formed. The metal base color layer is formed on one main surface of the print target plate by solid coating with a metallic ink. The design layer, in which a metal finish pattern such as a hair line is printed with a smoke ink or the like, is formed on the upper surface of the metal base color layer (e.g., see Patent Document 1).

In this conventional expression method, the design layer can be whitened by removing the ink so as to have a pattern shape such as a letter, a symbol and a mark. Since there is contrast between the pattern portion and the surrounding portion thereof, it is considered that this expression method can also be used for an alignment mark or a guide (alignment mark and guide are collectively referred to as "an alignment mark and the like" below in some cases) for positioning of a plate in a manufacturing step of a product which uses the plate, in addition to the use for improving design properties.

Patent Document 1: JP-A-2000-211234

SUMMARY OF THE INVENTION

However, in the conventional expression method disclosed in Patent Document 1, there is a problem as follows. That is, since a pattern shape such as a design should be made to be recognized by contrast, it is necessary to use different inks in the metal base color layer and the design layer, and thus a printing step becomes complicated. In addition, when the printed layer is visually recognized from a surface on which the printed layer is not formed, through the print target plate, there are some cases that difference (contrast) in color of the printed layer comes to be visually recognized and thus, a desired design cannot be obtained.

An object of the present invention is to provide, with a simple step, a plate with a printed layer in which contrast of the printed layer can be visually recognized only when the printed layer is visually recognized from a surface on which the printed layer is formed, to provide a manufacturing method thereof, and to provide a display device.

A plate with a printed layer according to the present invention, includes a plate having a bent portion, a lower printed layer, and an upper printed layer provided at a portion of the lower printed layer, in which at least a portion of the lower printed layer is provided at a position corresponding to the bent portion on a main surface of the plate.

According to the present invention, for example, whether an ink in the lower printed layer is the same as or different from an ink in the upper printed layer, a difference in thickness occurs between a single-layer portion of the lower printed layer, at which the upper printed layer is not provided, and a multi-layer portion of the lower printed layer, at which the upper printed layer is provided. Therefore, when the plate with a printed layer is irradiated with light, contrast can be visually recognized only in the case where the printed layer is visually recognized from a surface on which the printed layer is formed. Thus, using the same ink is not necessarily required for forming the lower printed layer and the upper printed layer. Accordingly, the printed layer having contrast can be formed on the plate with a simple step.

In a manufacturing step of a product using the plate with a printed layer which has a bent portion, positioning of the plate with a printed layer to a casing and the like has been difficult. However, the positioning is easily performed by using the multi-layer portion as an alignment mark and the like.

In the plate with a printed layer in the present invention, it is preferred that the lower printed layer includes a first printed layer and a second printed layer which are provided in regions of the main surface to be adjacent to each other, and the upper printed layer is configured of a portion of the second printed layer provided on the first printed layer.

According to this aspect of the present invention, the upper printed layer can be simultaneously formed when the second printed layer is formed and thud, the printed layer having contrast can be formed on the plate with a simple step.

In the plate with a printed layer in the present invention, a plurality of upper printed layers are preferably provided.

According to this aspect of the present invention, two-dimensional or three-dimensional positioning of the plate with a printed layer is easily performed by using a plurality of multi-layer portions as alignment marks and the like.

In the plate with a printed layer in the present invention, the sizes of the plurality of upper printed layers in plan view are preferably different from each other.

According to this aspect of the present invention, the multi-layer portions having different sizes can be used as respective alignment marks and the like. Therefore, for example, a plurality of the plates with a printed layer can be placed such that the alignment marks and the like having the same predetermined size of the respective plates are at the same position on a casing. In addition, this placing work can be accurately and easily performed.

In the plate with a printed layer in the present invention, the upper printed layer has a thickness of preferably from 0.5 µm to 8 µm.

According to this aspect of the present invention, in plan view, contrast between the single-layer portion and the multi-layer portion can be easily and clearly provided.

In the plate with a printed layer in the present invention, a ratio of the thickness of the single-layer portion of the lower printed layer, at which the upper printed layer is not provided to the thickness of the multi-layer portion thereof at which the upper printed layer is provided is preferably 0.6 or greater.

According to this aspect of the present invention, in plan view, contrast between the single-layer portion and the multi-layer portion can be easily and clearly provided.

In the plate with a printed layer in the present invention, it is preferable that unevenness is provided at an outer edge of the lower printed layer in plan view and a difference between the maximum value and the minimum value of the unevenness is 40 µm or smaller.

According to this aspect of the present invention, a boundary in the plate with a printed layer between a non-printing region in which the lower printed layer is not provided and the single-layer portion can be formed in a straight line or a curved line without unevenness. Thus, favorable aesthetics can be realized. The term of "difference between the maximum value and the minimum value of the unevenness" means a difference between the most protruding portion and the most recessed portion in a planar direction when the outer edge of the printed layer is observed from the top.

In the plate with a printed layer in the present invention, it is preferable that the plate is a transparent plate and the lower printed layer is provided at at least a portion of a circumferential region of the main surface.

According to this aspect of the present invention, a region of the transparent plate other than the circumferential region thereof can be served as a non-printing region, and a display panel and the like can be disposed at a position facing the non-printing region.

A wiring of the display panel and the like can be hidden by the single-layer portion and the multi-layer portion, and favorable aesthetics can be realized.

Furthermore, leakage of light from the display panel can be suppressed by the single-layer portion and the multi-layer portion. In particular, in the case where the lower printed layer is provided in a frame shape and the display panel is disposed within the frame, light of the display panel is easily leaked from the corner in the inner edge of the frame. However, the leakage of light can be more suppressed in a manner that the multi-layer portion is formed by providing the upper printed layer in a region adjacent to the corner.

In the plate with a printed layer in the present invention, the plate is preferably glass.

According to this aspect of the present invention, the plate with a printed layer having high strength and favorable texture can be provided by using glass as the plate.

In the plate with a printed layer in the present invention, the glass is preferably a tempered glass.

According to this aspect of the present invention, the plate with a printed layer which has excellent strength and scratch resistance can be provided by using a tempered glass as the glass.

A display device according to the present invention, includes the above-described plate with a printed layer, a display panel and an adhesive layer for bonding the plate with a printed layer and the display panel to each other, in which the plate constituting the plate with a printed layer is a transparent plate.

According to the present invention, the multi-layer portion can be used as alignment marks and the like. Therefore, positioning of the plate with a printed layer, which is used as a cover member, is easily performed and the display device is easily manufactured. Also, a worker can instantaneously determine the correct orientation of the plate with a printed layer and thus, work efficiency by the worker can be improved.

A manufacturing method of a plate with a printed layer according to the present invention, which is a method of forming a printed layer on a main surface of a plate by using an ink jet method, includes forming a first printed layer in a first region and forming a second printed layer which continues from a portion on the first printed layer to a second region adjacent to the first region.

According to the present invention, the printed layer having contrast imparted by the single-layer portion and the multi-layer portion can be formed with a simple step in which, when the second printed layer is formed by relatively moving nozzles and the plate while an ink is discharged, the nozzles are positioned on the first printed layer when discharging starts or ends.

Since the second printed layer is formed from the second region over the first printed layer, the printed layer can be reliably formed at a boundary between the first region and the second region and favorable aesthetics can be realized.

Furthermore, the difference between the maximum value and the minimum value of an unevenness at the outer edge of the lower printed layer including the first printed layer and the second printed layer can be set to be 40 μm or smaller, and a boundary between the non-printing region and the single-layer portion in the plate with a printed layer can be formed in a straight line or a curved line without unevenness. Thus, favorable aesthetics can be realized.

In the manufacturing method of a plate with a printed layer according to the present invention, the second printed layer is preferably formed such that the thickness of a portion on the first printed layer, on which the second printed layer is formed, is thinner than the thickness of a portion on the second region.

According to this aspect of the present invention, spreading of wetting on the first printed layer can be suppressed by setting the thickness of the portion on the first printed layer, on which the second printed layer is formed, to be thin and thus, the alignment marks and the like having high contrast can be obtained.

In the manufacturing method of a plate with a printed layer according to the present invention, it is preferable that the plate has a bent portion, and at least a portion of the first printed layer is formed at a position corresponding to the bent portion in the main surface.

According to this aspect of the present invention, the plate with a printed layer in which positioning is easily performed can be provided.

BRIEF DESCRIPTION OF THE DRAWINGS

FIG. 5A illustrates a left corner portion and FIG. 5B illustrates a right corner portion.

FIG. 6A illustrates a right corner portion and FIG. 6B illustrates a left corner portion.

FIG. 7A illustrates a method of forming a left-side printed layer and FIG. 7B illustrates a method of forming a right-side printed layer.

FIG. 8A illustrates a method of forming an upper-side printed layer and FIG. 8B illustrates a method of forming a lower-side printed layer.

MODE FOR CARRYING OUT THE INVENTION

Definitions of the following terms are applied over this Specification and Claims.

The "flat portion" means a portion having an average curvature radius of greater than 10,000 mm.

The "bent portion" means a portion having an average curvature radius of 10,000 mm or smaller.

Figure 1A:
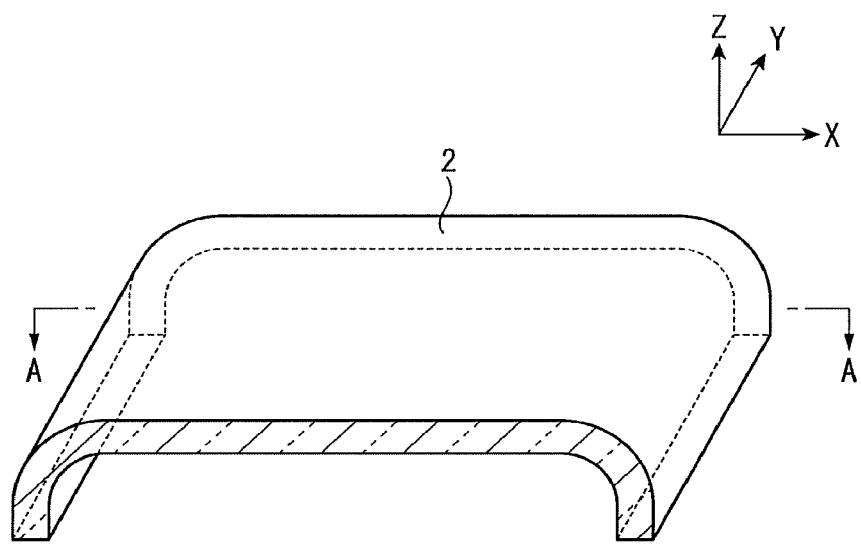
FIG. 1A is a perspective view illustrating a plate having a bent portion according to an embodiment of the present invention.

The "bending depth" means, in sectional view in a thickness direction of a plate having a bent portion (also described as a "bent plate" below), a distance between a line segment joining two end portions and a tangent line at the bent portion of the bent plate which is parallel to the line segment. In a bent plate 2 as illustrated in FIG. 1A and FIG. 1B, the bending depth means a distance h between both ends of the bent plate 2 in a bent direction.

Figure 1B:
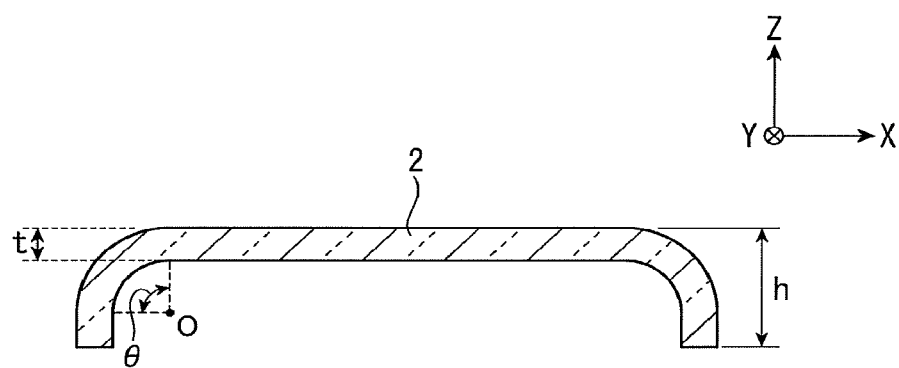
FIG. 1B is a sectional view taken along line A-A in FIG. 1A.

The "bending angle" means an angle θ formed by joining both ends of the bent portion and the curvature radius center O, in sectional view in the thickness direction as illustrated in FIG. 1B. Descriptions will be made on the assumption that a bent portion having a constant curvature radius is used as an example. However, the bent plate may have a bent portion having a curvature radius which continuously changes. In this case, the curvature radius center O may be set as the center of an average curvature radius between the maximum value and the minimum value of the curvature radius.

Figure 2A:
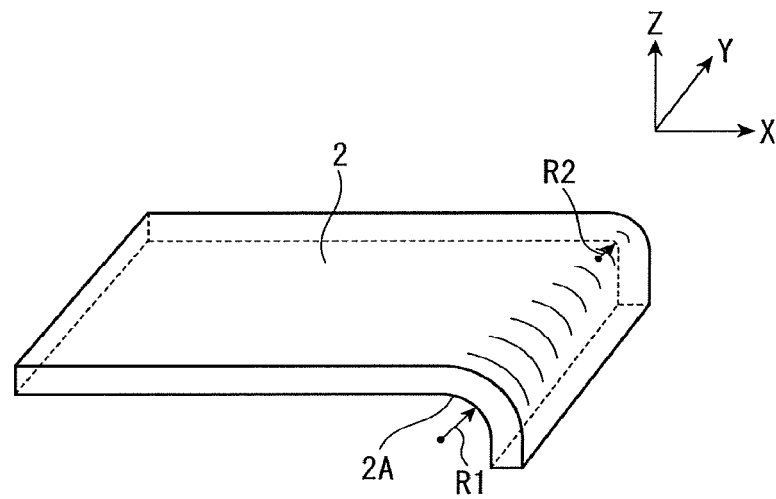
FIG. 2A and FIG. 2B are perspective views illustrating a plate having a bent portion according to another embodiment.
Figure 2B:
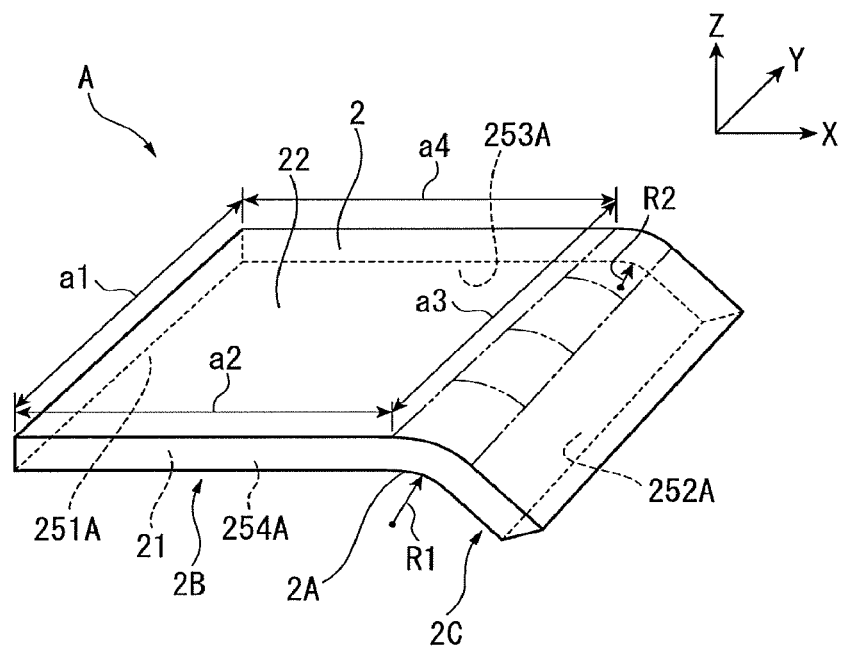

The "twist structure" means a structure in which portions having different curvature radius are provided in the same bent portion 2A, for example, a structure in which a curved shape having a curvature radius R1 is provided on one end side of the bent portion 2A and another curved shape having a curvature radius R2 smaller than R1 is provided on the other end side thereof in the bent plate 2 as illustrated in FIG. 2A and FIG. 2B.

The "optical density (OD value)" is the absolute value of a value obtained by expressing a ratio of the transmitted light amount T of certain light which has passed through a measurement target object to the incident light amount I of the certain light, in common logarithm with the base of 10. The OD value indicates hiding performance. For example, when the incident light amount is 1000 and the transmitted light amount is 1 regarding visible light having a wavelength of 500 nm, the OD value at this time is calculated as $|\text{Log}_{10}(1/1000)|=3$. The OD value can be measured by using an OD measuring device (manufactured by Lambda Vision Inc., product name: LV-®).

The "average" means arithmetic mean of pieces of data of five points, unless otherwise specified.

Embodiment

Hereinafter, an embodiment of the present invention will be described with reference to the drawings.
Configuration of Plate with Printed Layer First, a configuration of the plate with a printed layer will be described.

Figure 3:
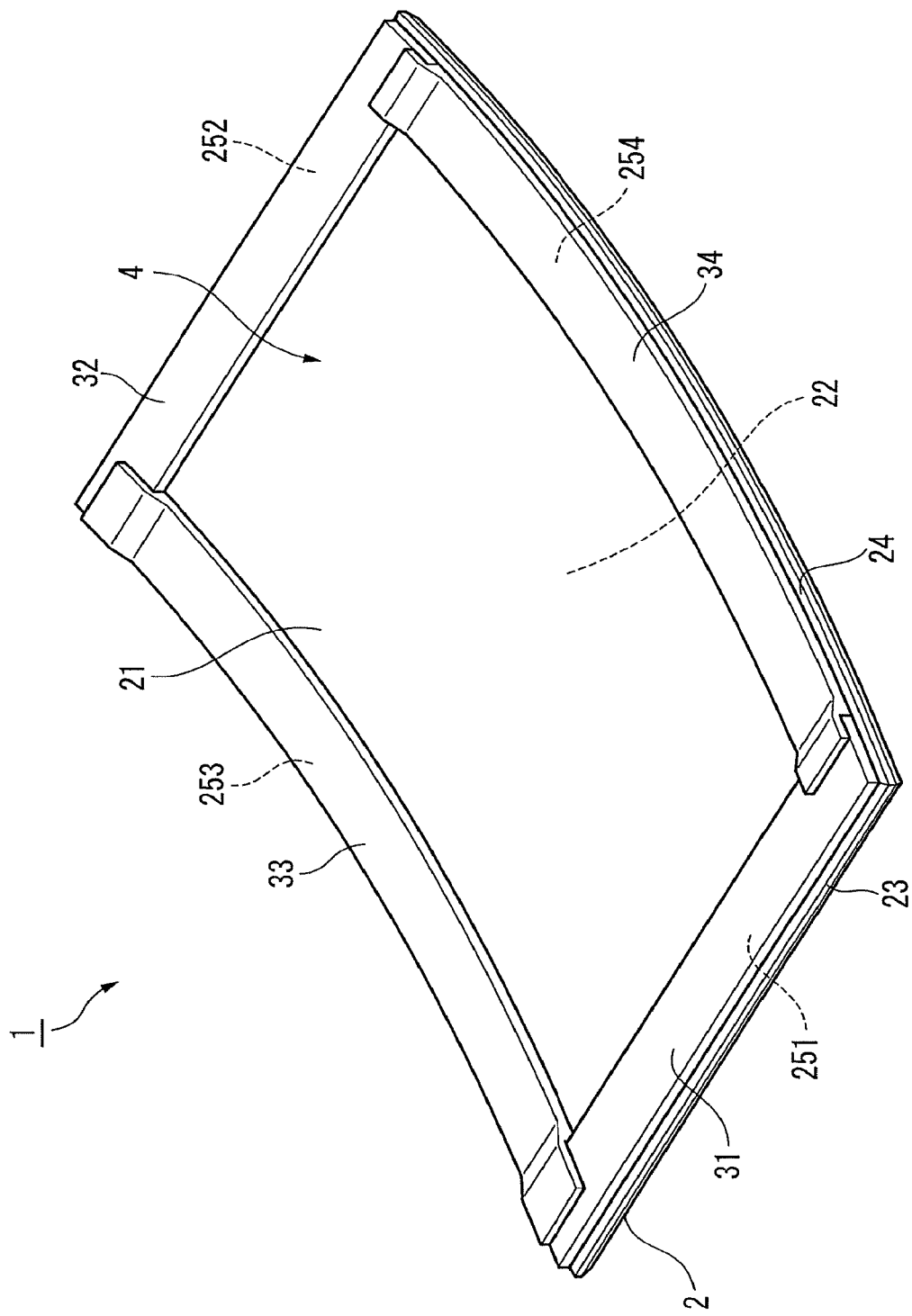
FIG. 3 is a perspective view illustrating a plate with a printed layer in the embodiment.

A plate 1 with a printed layer illustrated in FIG. 3 includes a bent plate 2 as a transparent plate, a left-side printed layer 31 as a first printed layer, a right-side printed layer 32 as another first printed layer, an upper-side printed layer 33 as a second printed layer, and a lower-side printed layer 34 as another second printed layer.

The bent plate 2 is a transparent tempered glass of rectangular in plan view. The center of the rectangle in a longitudinal direction is formed to be curved and recessed to a second main surface 22 side in comparison to both ends thereof. The entirety of the bent plate 2 constitutes a bent portion. The bent plate 2 includes a first main surface 21, the second main surface 22, and an end surface 23. A chamfered portion 24 is provided on the end surface 23.

A pair of long sides constituting the rectangle is referred to as an upper side and a lower side below. A pair of short sides is referred to as a left side and a right side below. A short-side direction is referred to as a "vertical direction" and a long-side direction is referred to as a "horizontal direction".

The printed layers 31 to 34 are provided in order to impart a light shielding property to the plate 1 with a printed layer. The left-side printed layer 31 is provided in a left-side region 251 as a first region which extends in a vertical direction along the left side and has a rectangular shape, in a circumferential region of the first main surface 21, which has a square frame shape. The right-side printed layer 32 is provided in a right-side region 252 as a first region which extends along the right side and has the same shape as the left-side region 251, in the circumferential region. The upper-side printed layer 33 and the lower-side printed layer 34 are provided in an upper-side region 253 and a lower-side region 254 as a second region which extends in the horizontal direction along the upper side and the lower side and has a rectangular shape, respectively in the circumferential region.

Next, the detailed configuration of the printed layers 31 to 34 will be described with reference to FIG. 4, FIG. 5A, FIG. 5B, FIG. 6A, and FIG. 6B.

Figure 4:
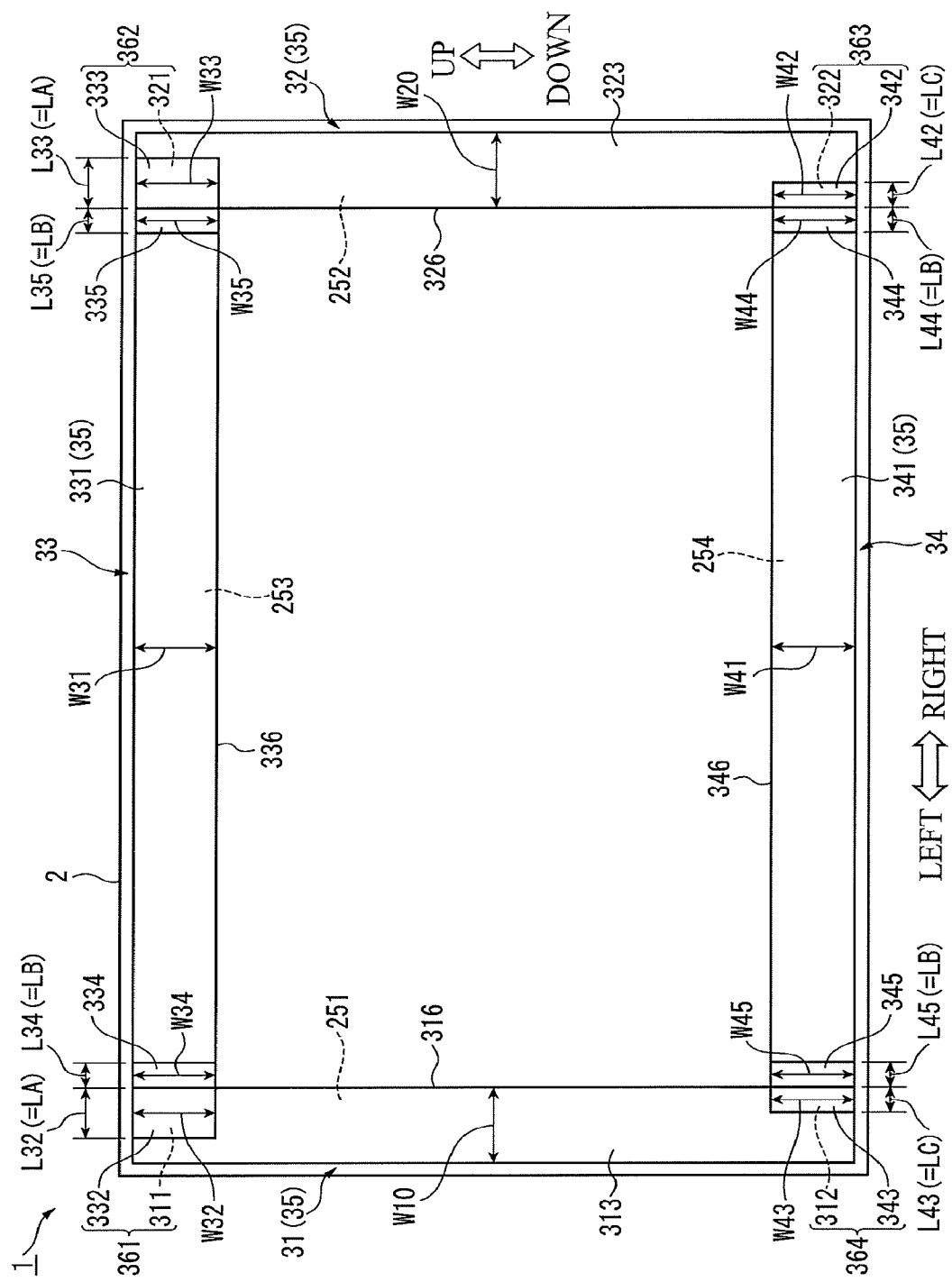
FIG. 4 is a plan view illustrating the plate with a printed layer when being developed on a plane.
Figure 5A:
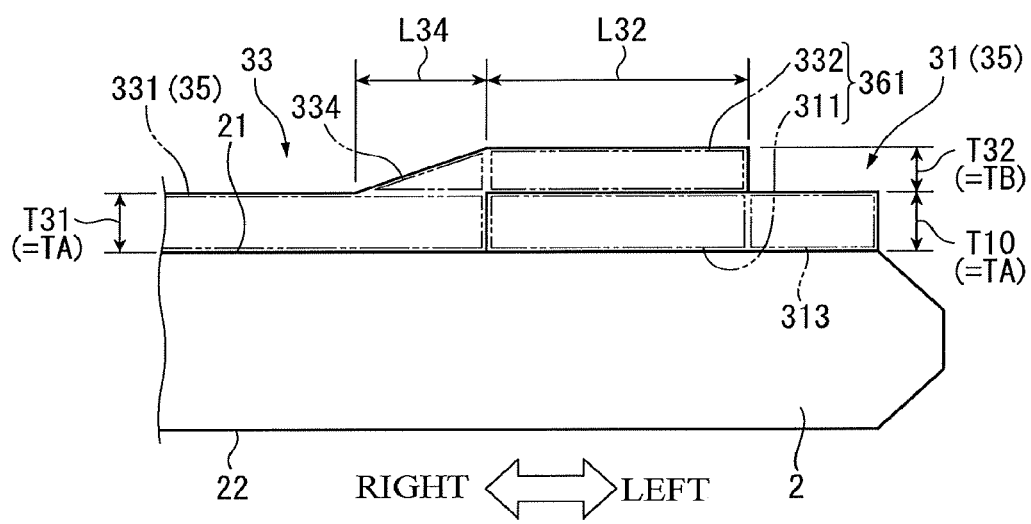
FIG. 5A and FIG. 5B are side views when the plate with a printed layer is viewed from an upper side.
Figure 5B:
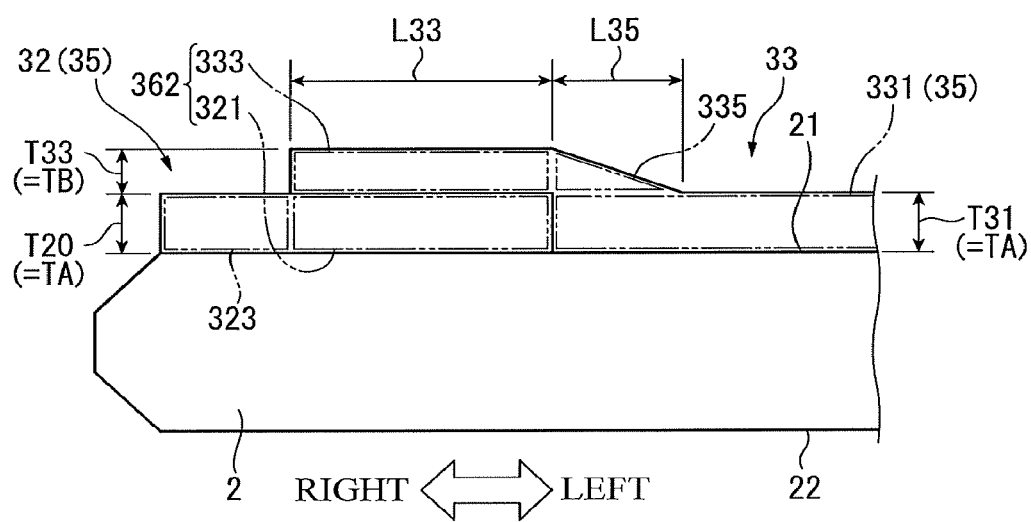
Figure 6A:
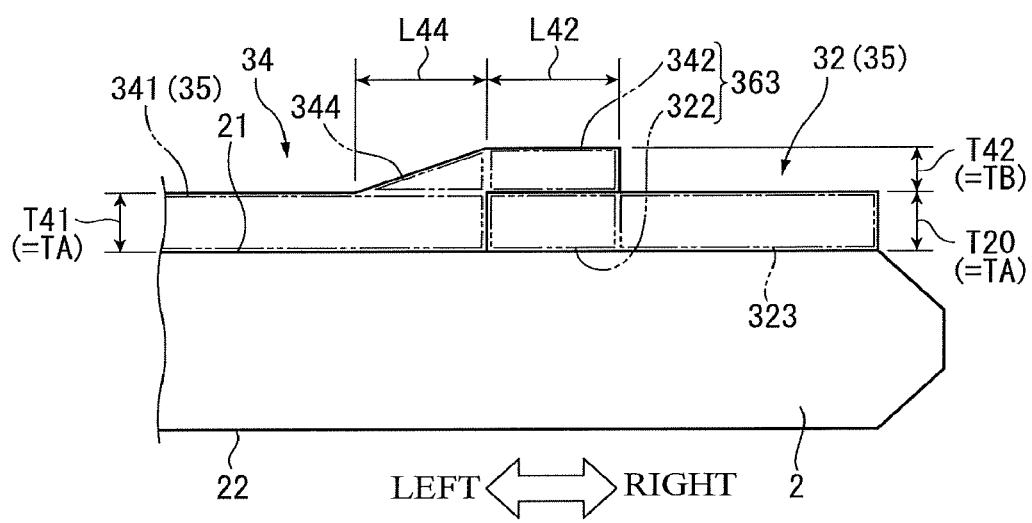
FIG. 6A and FIG. 6B are side views when the plate with a printed layer is viewed from a lower side.
Figure 6B:
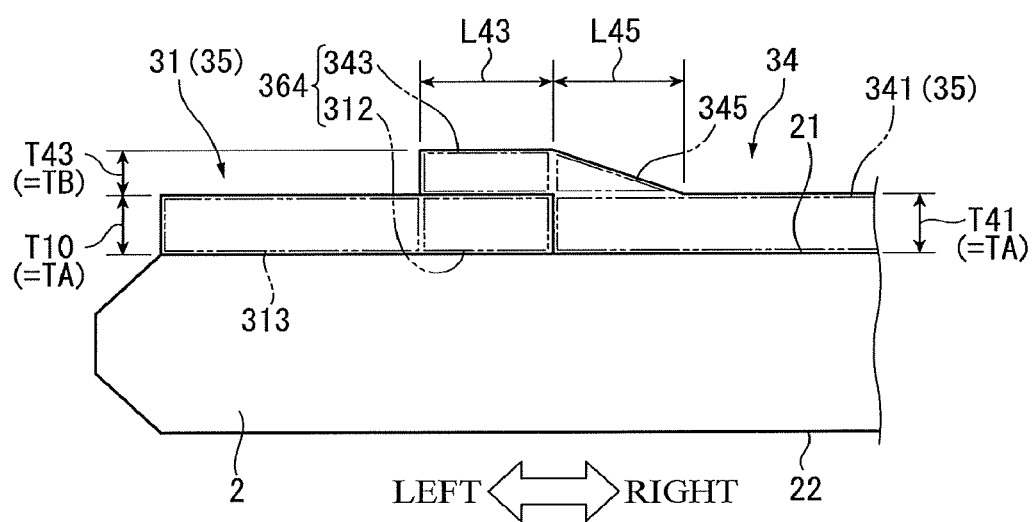

FIG. 4 is a plan view illustrating the plate 1 with a printed layer when being developed on a plane. FIG. 5A and FIG. 5B are side views when the plate 1 with a printed layer is viewed from the upper side. FIG. 6A and FIG. 6B are side views when the plate 1 with a printed layer is viewed from the lower side. FIG. 5A to FIG. 6B flatly illustrate the bent plate 2 or each of the printed layers 31 to 34. However, in practice, the bent plate 2 and the printed layers 31 to 34 are curved.

As illustrated in FIG. 4, the upper-side printed layer 33 includes an upper-side single-layer portion 331, a first upper printed layer 332, a second upper printed layer 333, a first connection portion 334, and a second connection portion 335.

As indicated by two-dot chain lines in FIG. 5A and FIG. 5B, the upper-side single-layer portion 331 is a portion having a rectangular shape in side view. The upper-side single-layer portion 331 is directly provided on the first main surface 21.

The upper printed layers 332 and 333 are portions having a rectangular shape in side view, as indicated by two-dot chain lines in FIG. 5A and FIG. 5B. The first upper printed layer 332 is provided at an end portion of the left-side printed layer 31 on the upper right side. The second upper printed layer 333 is provided at an end portion of the right-side printed layer 32 on the upper left side.

The connection portions 334 and 335 are portions having a triangular shape in side view, as indicated by two-dot chain lines in FIG. 5A and FIG. 5B. The first connection portion 334 connects the left side of the upper-side single-layer portion 331 on an upper surface thereof and the right end of the first upper printed layer 332 to each other. The second connection portion 335 connects the right side of the upper-side single-layer portion 331 on the upper surface thereof and the left end of the second upper printed layer 333 to each other.

As illustrated in FIG. 4, the lower-side printed layer 34 includes a lower-side single-layer portion 341, a third upper printed layer 342, a fourth upper printed layer 343, a third connection portion 344, and a fourth connection portion 345.

As indicated by two-dot chain lines in FIG. 6A and FIG. 6B, the lower-side single-layer portion 341 is a portion having a rectangular shape in side view. The lower-side single-layer portion 341 is directly provided on the first main surface 21.

As indicated by two-dot chain lines in FIG. 6A and FIG. 6B, the upper printed layers 342 and 343 are portions having a rectangular shape. The third upper printed layer 342 is provided at an end portion of the right-side printed layer 32 on the lower left side. The fourth upper printed layer 343 is provided at an end portion of the left-side printed layer 31 on the lower right side.

The connection portions 344 and 345 are portions having a triangular shape in side view, as indicated by two-dot chain lines in FIG. 6A and FIG. 6B. The third connection portion 344 connects the right side of the lower-side single-layer portion 341 on the upper surface thereof and the left end of the third upper printed layer 342 to each other. The fourth connection portion 345 connects the left side of the lower-side single-layer portion 341 on the upper surface thereof and the right end of the fourth upper printed layer 343 to each other.

The entireties of the left-side printed layer 31 and the right-side printed layer 32 are directly provided on the first main surface 21.

As illustrated in FIG. 4, the left-side printed layer 31 includes a first multi-layer-portion constituent portion 311, a fourth multi-layer-portion constituent portion 312, and a left-side single-layer portion 313. The multi-layer-portion constituent portions 311 and 312 are portions on which the upper printed layers 332 and 343 are provided on the upper surfaces thereof, respectively. The left-side single-layer portion 313 is a portion other than the multi-layer-portion constituent portions 311 and 312.

The right-side printed layer 32 includes a second multi-layer-portion constituent portion 321, a third multi-layer-portion constituent portion 322, and a right-side single-layer portion 323. The multi-layer-portion constituent portions 321 and 322 are portions on which the upper printed layers 333 and 342 are provided on the upper surfaces thereof, respectively. The right-side single-layer portion 323 is a portion other than the multi-layer-portion constituent portions 321 and 322.

The left-side printed layer 31 and the right-side printed layer 32 as the first printed layer, and the upper-side single-layer portion 331 and the lower-side single-layer portion 341 which constitute the second printed layer, constitute the lower printed layer 35 in the present invention. The lower printed layer 35 is provided at a position corresponding to the bent portion of the first main surface 21.

The upper printed layers 332, 333, 342, and 343 are configured by a portion of the upper-side printed layer 33 or the lower-side printed layer 34 as the second printed layer, and are provided at a portion of the lower printed layer 35.

The first multi-layer-portion constituent portion 311 and the first upper printed layer 332 constitute a first multi-layer portion 361. The second multi-layer-portion constituent portion 321 and the second upper printed layer 333 constitute a second multi-layer portion 362. The third multi-layer-portion constituent portion 322 and the third upper printed layer 342 constitute a third multi-layer portion 363. The fourth multi-layer-portion constituent portion 312 and the fourth upper printed layer 343 constitute a fourth multi-layer portion 364.

As illustrated in FIG. 4, the widths W31, W32, W33, W34, and W35 of the upper-side single-layer portion 331, the upper printed layers 332 and 333, and the connection portions 334 and 335 may be equal to each other or different from each other. The widths W41, W42, W43, W44, and W45 of the lower-side single-layer portion 341, the upper printed layers 342 and 343, and the connection portions 344 and 345 may be equal to each other or different from each other. The width W10 of the left-side printed layer 31, the width W20 of the right-side printed layer 32, for example, the width W31 of the upper-side single-layer portion 331, and, for example, the width W41 of the lower-side single-layer portion 341 may be equal to each other or different from each other.

In the present embodiment, the case where all of the widths W10, W20, W31 to W35, and W41 to W45 are equal to each other is exemplified.

The lengths L32, L33, L34, and L35 of the upper printed layers 332 and 333 and the connection portions 334 and 335 may be equal to each other or different from each other. The lengths L42, L43, L44, and L45 of the upper printed layers 342 and 343 and the connection portions 344 and 345 may be equal to each other or different from each other.

In the present embodiment, when the lengths L32 and L33 are set as LA, the lengths L34, L35, L44, and L45 are set as LB, and the lengths L42 and L43 are set as LC, the case where LA is greater than LC (e.g., the length L32 is longer than the length L42) is exemplified. With such a configuration, in plan view, the size of the first multi-layer portion 361 is equal to the size of the second multi-layer portion 362, the size of the third multi-layer portion 363 is equal to the size of the fourth multi-layer portion 364, and the size of the multi-layer portions 361 and 362 is greater than the size of the multi-layer portions 363 and 364.

As illustrated in FIG. 5A, FIG. 5B, FIG. 6A, and FIG. 6B, the thicknesses T10, T20, T31, T32, T33, T41, T42, and T43 of the left-side printed layer 31, the right-side printed layer 32, the upper-side single-layer portion 331, the upper printed layers 332 and 333, the lower-side single-layer portion 341, and the upper printed layers 342 and 343 may be equal to each other or different from each other.

In the preset embodiment, when the thicknesses T10, T20, T31, and T41 are set as TA and the thicknesses T32, T33, T42, and T43 are set as TB, the case where TA is greater than TB (e.e., the thickness T31 is thicker than the thickness T32) is exemplified. Since the multi-layer portions 361, 362, 363, and 364 are thicker than the single-layer portions 313, 323, 331, and 341, contrast occurs when the plate 1 with a printed layer is irradiated with light.

The thicknesses T10, T20, T31, and T41 of the left-side printed layer 31, the right-side printed layer 32, the upper-side single-layer portion 331, and the lower-side single-layer portion 341 (lower printed layer 35) are preferably 7 μm or smaller. If the thickness is the upper limit value or smaller, contrast between the single-layer portions 313, 323, 331, and 341 and the multi-layer portions 361, 362, 363, and 364 can be easily and clearly imparted in plan view. In the case where the thickness of the lower printed layer 35 is greater than the upper limit value, a step with the region in which the printed layer is not formed is increased, and defects may be easily formed by, for example, adhesion bonding in the post step. The thicknesses T10, T20, T31, and T41 are more preferably 5 μm or smaller and further preferably 4 μm or smaller.

The lower limit value of the thicknesses T10, T20, T31, and T41 is not particularly limited, and is preferably 0.5 μm or greater. If the thickness is smaller than the lower limit value, the hiding property of the lower printed layer 35 may be deteriorated. The thicknesses T10, T20, T31, and T41 are more preferably 0.6 μm or greater and further preferably 0.7 μm or greater.

The thicknesses T32, T33, T42, and T43 of the upper printed layers 332, 333, 342, and 343 are preferably 5 μm or smaller. If the thickness is the upper limit value or smaller, contrast between the single-layer portions 313, 323, 331, and 341 and the multi-layer portions 361, 362, 363, and 364 can be easily and clearly imparted in plan view. In the case where the thicknesses of the upper printed layers 332, 333, 342, and 343 are greater than the upper limit value, the upper printed layers 332, 333, 342, and 343 may be wet and spread on the lower printed layer 35. As a result, a boundary between the upper printed layers 332, 333, 342, and 343 and the lower printed layer 35 may become ambiguous in plan view, and thus it may be difficult to impart contrast. The thicknesses T32, T33, T42, and T43 are more preferably 3 μm or smaller and further preferably 2 μm or smaller.

The lower limit value of the thicknesses T32, T33, T42, and T43 is not particularly limited, and is preferably 0.5 μm or greater. The reason is because, if the thickness is smaller than the lower limit value, it may be difficult to impart contrast and to use the layers as the alignment mark and the like. The thicknesses T32, T33, T42, and T43 are more preferably 0.6 μm or greater and further preferably 0.7 μm or greater.

Measurement of the thickness is not particularly limited. For example, arithmetic mean of a measurement area can be used as the thickness, measured by using DektakXT (manufactured by BRUKER Corporation).

A ratio α of the thickness of the lower printed layer 35 to the thicknesses of the multi-layer portions 361, 362, 363, and 364 is preferably 0.6 or greater. In the case where the ratio α is the lower limit value or greater, a step formed by the lower printed layer 35 and the multi-layer portions 361, 362, 363, and 364 do not become too large. Thus, defects may not likely occur in the post step. The ratio α is more preferably 0.7 or greater and further preferably 0.8 or greater.

The upper limit of the ratio α is not particularly limited and preferably 0.95 or smaller. Thus, in plan view, contrast between the single-layer portions 313, 323, 331, and 341, and the multi-layer portions 361, 362, 363, and 364 can be clearly and easily imparted. The ratio α is more preferably 0.9 or smaller.

The average value of OD values in the multi-layer portions 361, 362, 363, and 364 for visible light and the average value of OD values in the single-layer portions 313, 323, 331, and 341 are preferably 3 or greater. Thus, the hiding property can be improved by the printed layer. The lower limit value is more preferably 4 or greater.

The average value of OD values in the multi-layer portions 361, 362, 363, and 364 for visible light and the average value of OD values in the single-layer portions 313, 323, 331, and 341 are not particularly limited and preferably 8 or smaller. In the case where a printed layer having an OD value greater than the upper limit value is provided, the printed layer may be required to become thick. Thus, defects may be easily formed by, for example, bonding of an adhesive layer in the post step. The upper limit value is more preferably 7 or smaller and further preferably 6 or smaller.

An unevenness may be provided at inner edges 316, 326, 336, and 346 of the printed layers 31 to 34 on an in-plane side of the first main surface 21 in plan view, that is, at outer edges of the printed layers 31 to 34. A difference between the maximum value and the minimum value of the unevenness (simply referred to as an "unevenness difference" below) is preferably 40 μm or smaller. Thus, the boundary between the non-printing region in which the lower printed layer is not provided and the single-layer portion in the plate 1 with a printed layer can be formed by a straight line or a curved line without unevenness. Thus, favorable aesthetics can be realized. The unevenness difference is more preferably 35 μm or smaller, further preferably 50 μm or smaller, and particularly preferably 20 μm or smaller.

"The unevenness difference" means the difference between the most protruding portion and the most recessed portion in an observation surface in a planar direction when the outer edge of the printed layer is observed from the top.

As illustrated in FIG. 3, a region surrounded by the printed layers 31 to 34 in the plate 1 with a printed layer serves as a display region 4 in which a display panel such as a liquid crystal panel is disposed. In the case where the plate 1 with a printed layer is used in a display device (see FIG. 10), a display panel such as a liquid crystal panel is disposed in the display region 4. Wirings, circuits, and the like for driving are provided on the display panel. In the case where the display panel is visually recognized through the bent plate 2, if the wirings and the like are viewed, aesthetics is impaired. The wirings and the like disposed in the vicinity of an outer circumference can be hidden by providing the printed layers 31 to 34 at a circumferential portion of the bent plate 2, and aesthetics can be improved.

In the case where the display panel is a liquid crystal panel, a backlight is provided on the back surface of the liquid crystal panel. If illumination light from the backlight is leaked to the outside of the display region 4, aesthetics is impaired. The leakage of the illumination light from the outer circumference of the display region 4 can be prevented by providing the printed layers 31 to 34 at the circumferential portion of the bent plate 2, and aesthetics can be improved.

In particular, illumination light from the backlight is easily leaked from the corner at the inner edge which is configured by the printed layers 31 to 34 and has a frame shape. However, since the multi-layer portions 361 to 364 which has a thick thickness and a high light shielding property are provided in a region adjacent to the corner, the leakage of the illumination light can be suppressed more.

Manufacturing Method of Plate with a Printed Layer

Next, a manufacturing method of the plate 1 with a printed layer will be described.

First, a bent plate 2 is prepared in a manner that transparent glass is cut out to have a predetermined size and then chamfering is performed. At this time, chamfering is preferably performed such that dimensions of the chamfered portion 24 in plan view is from 0.05 mm to 0.5 mm. Then, the bent plate 2 is formed to have the bent portion as illustrated in FIG. 3. A forming method of the bent plate 2 is not particularly limited. A self-weight forming method, a vacuum forming method, and a press forming method can be exemplified.

The self-weight forming method is a method of forming a glass plate to have a predetermined shape in a manner that the glass plate is installed on a predetermined mold depending on the shape of the bent plate 2 after forming, and then the glass plate is softened and bent by gravity so as to be fit into the mold. The vacuum forming method is a method of forming a glass plate to have a predetermined shape in a manner that differential pressure is applied to the front and back surfaces of the glass plate in a state where the glass plate is softened, and thus the glass plate is bent to be fit into the mold. The press forming method is a method of forming a glass plate to have a predetermined shape in a manner that the glass plate is installed between predetermined molds (lower mold, upper mold) depending on the shape of the bent plate 2 after forming, the press load is applied to the upper and lower molds in a state where the glass plate is softened, and thus the glass plate is bent to be fit into the mold.

Then, the printed layers 31 to 34 are formed on the bent plate 2 by an ink jet method. The ink jet method is a method of forming a dot-like pattern on the bent plate 2 by discharging fine liquid droplets of a liquid ink from nozzles in a pulse manner. The bent plate 2 is positioned based on an origin point of a nozzle moving mechanism as a reference. While the nozzles discharge fine liquid droplets of the ink based on a command from a computer, the nozzles move on the surface of the bent plate 2 in a substantially horizontal direction. Thus, a dot-like ink is continuously formed, and thus a printed layer having a predetermined pattern is formed. In the case of the bent plate 2 in which a printing target surface has a bent portion, considering the distortion and the like of the pattern, a distance between the nozzles of discharging liquid droplets of the ink and the bent plate 2 is preferably made to be substantially constant. That is, use can be preferably made of a mechanism in which the nozzles or the bent plate 2 can be rotated and moved in accordance with the pattern in a state where the distance between the nozzle and the bent plate 2 is maintained to be substantially constant. Since supply pressure for supplying the ink to the nozzles can become stable and the amount of the ink discharged from the nozzles can be maintained to be constant, a mechanism of fixing the nozzles and rotating and moving the bent plate 2 with respect to the nozzles is more preferable.

Figure 7A:
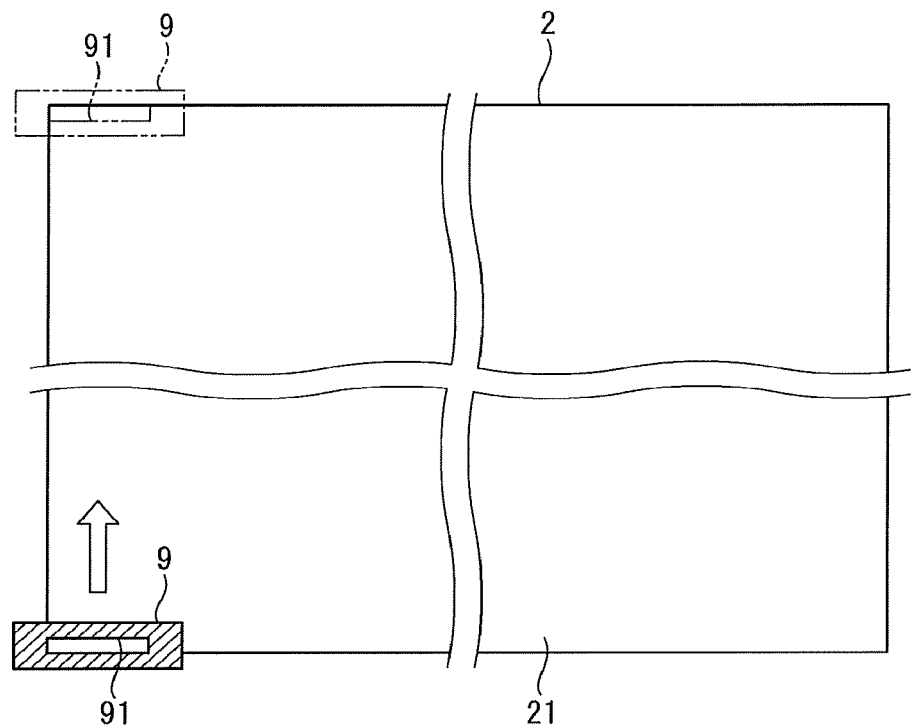
FIG. 7A and FIG. 7B are diagrams illustrating a manufacturing method of the plate with a printed layer.
Figure 7B:
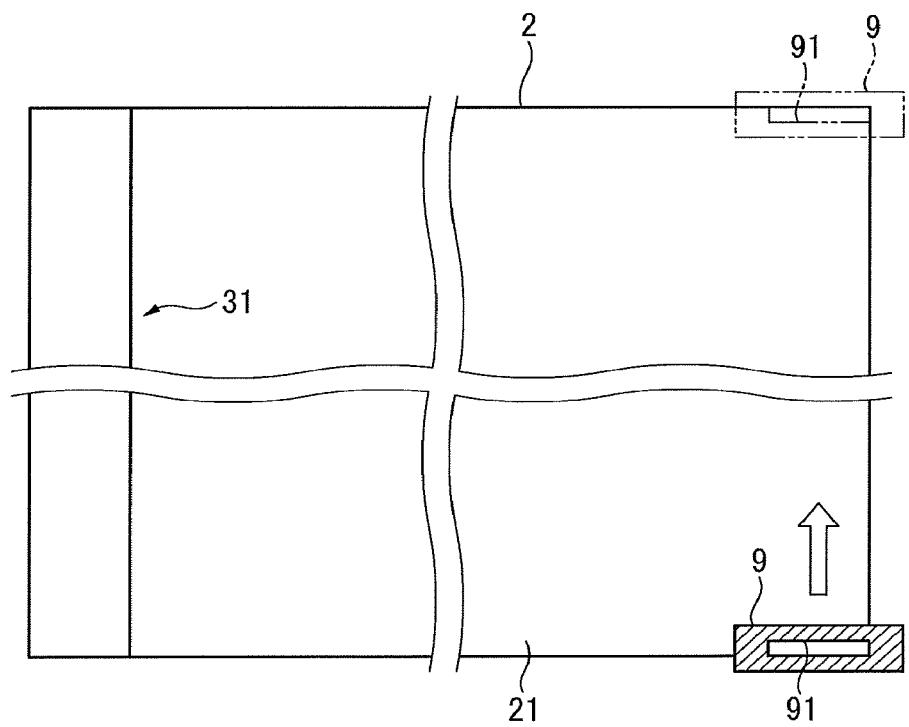

Specifically, the bent plate 2 is placed on a support stand (not illustrated). As indicated by a solid line in FIG. 7A, a discharge hole 91 of a nozzle 9 is positioned at a lower left end portion of the first main surface 21 of the bent plate 2. Then, while an ink is discharged from the discharge hole 91, the nozzle 9 is moved until the discharge hole 91 is positioned at an upper left end portion of the first main surface 21, as indicated by a two-dot chain line in FIG. 7A. Thus, the left-side printed layer 31 as illustrated in FIG. 7B is printed.

Then, at least one of the support stand and the nozzle 9 is moved (the nozzle 9 and the bent plate 2 are relatively moved). Thus, as indicated by a solid line in FIG. 7B, the discharge hole 91 is positioned at a lower right end portion of the first main surface 21. Then, as indicated by the two-dot chain line in FIG. 7B, the nozzle 9 for discharging the ink is moved until the discharge hole 91 is positioned at an upper right end portion of the first main surface 21. Thus, the right-side printed layer 32 as illustrated in FIG. 8A is printed.

Then, the upper-side printed layer 33 and the lower-side printed layer 34 are printed.

Figure 8A:
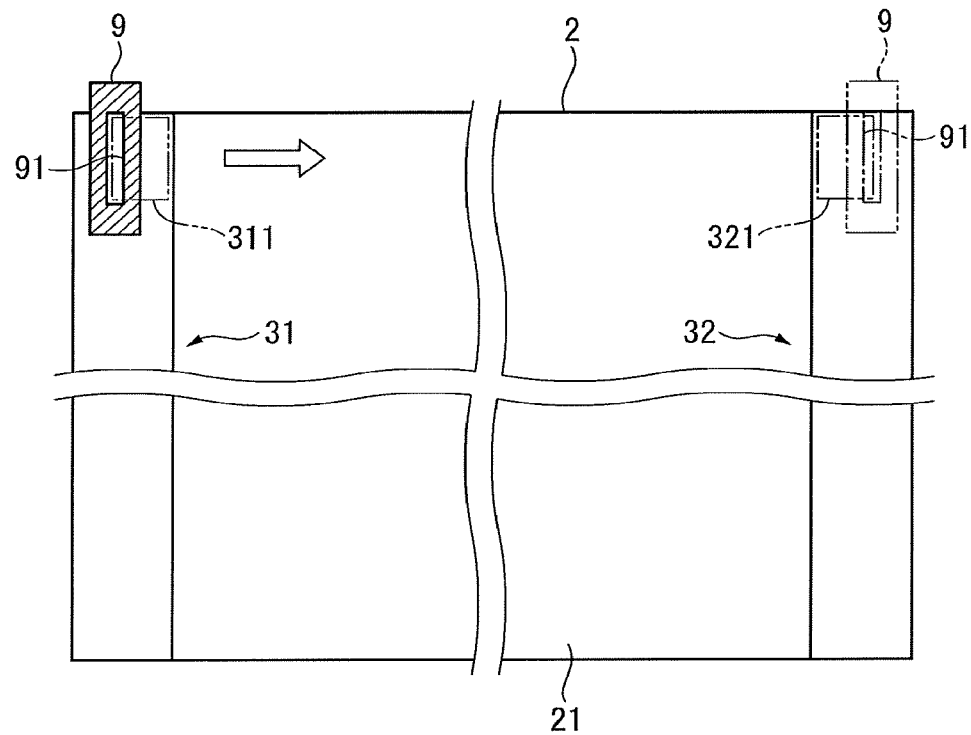
FIG. 8A and FIG. 8B are diagrams illustrating a manufacturing method of the plate with a printed layer.

When the upper-side printed layer 33 is formed, as indicated by a solid line in FIG. 8A, the discharge hole 91 is positioned over the left-side end portion of the first multi-layer-portion constituent portion 311 positioned on the right side of the upper left end side in the first main surface 21. Then, as indicated by a two-dot chain line in FIG. 8A, while the ink is discharged, the nozzle 9 is moved until the discharge hole 91 is positioned over the right-side end portion of the second multi-layer-portion constituent portion 321 positioned on the left side of the upper right end portion in the first main surface 21. Thus, the upper-side printed layer 33 as illustrated in FIG. 8B is printed.

Figure 8B:
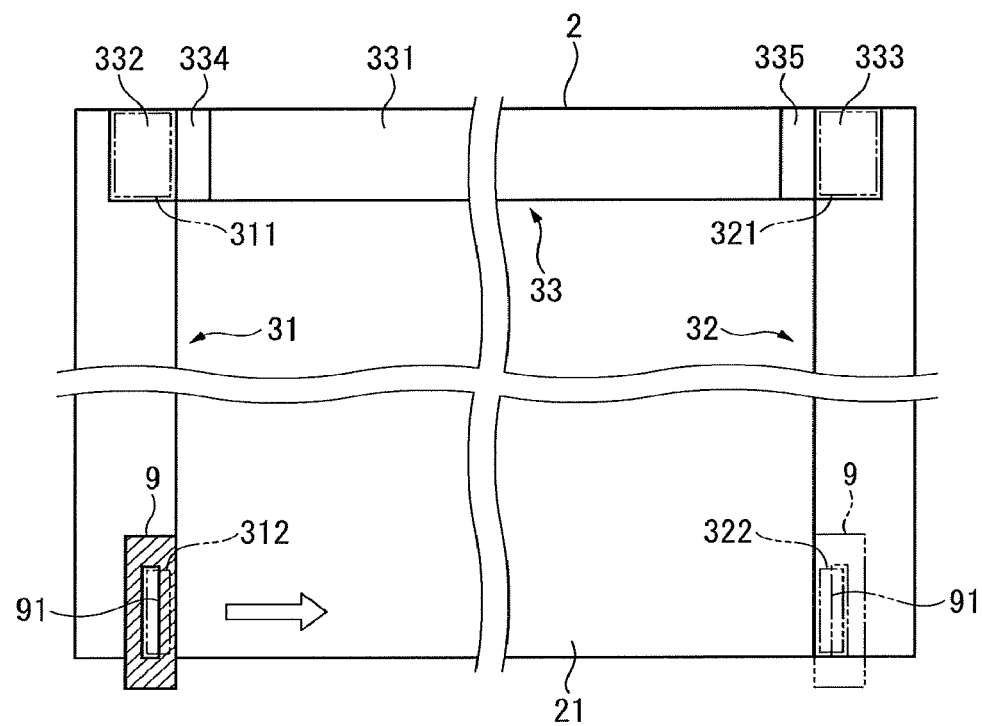

When the lower-side printed layer 34 is formed, as indicated by a solid line in FIG. 8B, the discharge hole 91 is positioned over the left-side end portion of the fourth multi-layer-portion constituent portion 312 positioned on the right side of the left-side end portion of the first multi-layer-portion constituent portion 311. Then, as indicated by a two-dot chain line in FIG. 8B, while the ink is discharged, the nozzle 9 is moved until the discharge hole 91 is positioned over the right-side end portion of the third multi-layer-portion constituent portion 322 positioned on the left side of the right-side end portion of the second multi-layer-portion constituent portion 321 in the first main surface 21. Thus, the lower-side printed layer 34 is printed.

The thickness of the printed layers 31 to 34 can be adjusted by controlling the amount of an ink discharged from the discharge hole 91 or a moving speed of the nozzle 9. For example, in the case where the printed layer is formed to be thick, the amount of the discharged ink may be set to be large or a movement speed may be reduced. In the case where the printed layer is formed to be thin, the amount of the discharged ink may be set to be small or a movement speed may be increased.

The amount of the discharged ink can be controlled by the amount of liquid droplets discharged from the discharge hole 91 of the nozzle 9 and an interval (discharge pitch) for performing discharging. When the amount of liquid droplets from one discharge hole 91 is set as L (pL) and the discharge pitch is set as P (μm), L/P (pL/μm) and the discharge amount have a correlation. L/P is preferably 7 or smaller. If L/P is the upper limit value or smaller, the discharge amount can be stabilized and bleeding can be suppressed in the case of performing printing linearly, and thus linearity can be stabilized. In the case of performing printing to have a curved shape, ink drooping can be suppressed and a desired curve shape can be obtained. L/P is more preferably 6 or smaller and further preferably 4 or smaller.

L/P is preferably 0.5 or greater. If L/P is the lower limit value or greater, the thickness or printing quality suitable for printing and the like for obtaining the light shielding property can be obtained, and a favorable printed layer can be obtained. L/P is more preferably 0.6 or greater, and further preferably 0.8 or greater.

The relative moving speed between the nozzle 9 and the bent plate 2 is preferably 250 mm/s or lower. If the relative moving speed between the nozzle 9 and the bent plate 2 is faster than the upper limit value, the printed layer easily receives an influence by an air flow or vibration generated between the nozzle 9 and the bent plate 2. A foreign matter entrapped by the air flow may be mixed to the printed layers 31 to 34 and may cause defects. The printed layers 31 to 34 which do not have desired linear accuracy due to vibration may be formed. Thus, a relative moving speed slower than the upper limit value is preferable. The relative moving speed is more preferably 230 mm/s or slower and further preferably 200 mm/s or slower.

The lower limit value of the relative moving speed between the nozzle 9 and the bent plate 2 is not particularly limited and is preferably 5 mm/s or faster. The relative moving speed influences a manufacturing time of the plate 1 with a printed layer. If the relative moving speed is the lower limit value or greater, the plate 1 with a printed layer including the printed layers 31 to 34 having high quality can be produced with high production efficiency. The relative moving speed is more preferably 10 mm/s or greater and further preferably 20 mm/s or greater.

In the present embodiment, as described above, the thicknesses T10, T20, T31 and T41 of the entirety of the left-side printed layer 31, the entirety of the right-side printed layer 32, the upper-side single-layer portion 331, and the lower-side single-layer portion 341, which constitute the lower printed layer 35, are equal to each other. Therefore, the printing conditions (amount of the discharged ink and moving speed of the nozzle 9) thereof are preferably the same.

On the other hand, the thicknesses T32, T33, T42, and T43 of the first to fourth upper printed layers 332, 333, 342, and 343 are thinner than the left-side printed layer 31 and the like. Thus, the printing conditions thereof are preferably different from those of the left-side printed layer 31 and the like. For example, preferably, the amount of the discharged ink is reduced or the moving speed of the nozzle 9 is increased. That is, when the upper-side printed layer 33 and the lower-side printed layer 34 are printed, the printing conditions when the printing starts and ends are preferably made different from printing conditions during a period therebetween.

A gap between the nozzle 9 and the bent plate 2 is preferably controlled to be from 0.5 mm to 2 mm. According to this, in the case where the printed layer is formed in a twist structure, the printed layer can be controlled to have a desired thickness range and a uniform printed layer is obtained. In addition, in the case where the plate 1 with a printed layer including the display region 4 as illustrated in FIG. 3 is produced, printing can be performed while high linearity is maintained for the boundary between the printed layer and the display region 4. In the case where printing is performed on the entire surface of the bent plate 2 and a portion such as the display region 4, at which the printed layer is not formed, is not provided, and in the case where uniformity of the thickness is not desired, the gap between the nozzle 9 and the bent plate 2 is not particularly limited.

Inks when the printed layers 31 to 34 are printed are preferably the same as each other.

Then, drying and firing may be performed to harden the printed layers 31 to 34. Accordingly, the plate 1 with a printed layer can be obtained. The drying or firing of the printed layers 31 to 34 may be performed every time each of the printed layers 31 to 34 is formed or may be performed after all the printed layers 31 to 34 are formed. That is, it is not particularly limited.

Advantageous Effect of Plate with a Printed Layer

In any of the case where the inks used for the lower printed layer 35 and the upper printed layers 332, 333, 342, and 343 are the same as each other, and the case of being different from each other, a difference in thickness between the single-layer portions 313, 323, 331, and 341 and the multi-layer portions 361, 362, 363, and 364 occurs. Thus, when the plate 1 with a printed layer is irradiated with light, in the case where the printed layers 31 to 34 are visually recognized from the first main surface 21 side of the plate 1 with a printed layer, contrast can be visually recognized. Accordingly, since using the same ink is not required, the printed layers 31 to 34 having contrast can be formed on the plate with a simple step.

Since the upper printed layers 332 and 333 are configured as a portion of the upper-side printed layer 33 and the upper printed layers 342 and 343 are configured as a portion of the lower-side printed layer 34, the upper printed layers 332, 333, 342, and 343 can be formed simultaneously when the upper-side printed layer 33 and the lower-side printed layer 34 are formed. Thus, the printed layers 31 to 34 having contrast can be formed with a simpler step.

Since the four upper printed layers 332, 333, 342, and 343 are provided in the plate 1 with a printed layer, if at least two of the four multi-layer portions 361, 362, 363, and 364 are used as alignment marks and the like, two-dimensional or three-dimensional positioning of the plate 1 with a printed layer can be easily performed.

Since the multi-layer portions 361 and 362 are set to be larger than the multi-layer portions 363 and 364, if these multi-layer portions are used as the alignment mark and the like, a plurality of the plates 1 with a printed layer can be placed such that the alignment mark and the like having the same predetermined size are at the same position on a casing. Thus, the placing work can be accurately and easily performed. A worker can instantaneously determine the correct orientation of a cover member and thus work efficiency by the worker can be improved.

When the upper-side printed layer 33 or the lower-side printed layer 34 is formed by relatively moving the nozzle 9 and the bent plate 2 while the ink is discharged by using the ink jet method, the printed layers 31 to 34 having contrast imparted by the single-layer portions 313, 323, 331, and 341 and the multi-layer portions 361, 362, 363, and 364 can be formed with a simple step in which the nozzles 9 are positioned on the left-side printed layer 31 or the right-side printed layer 32 when discharging starts or ends.

In particular, for example, since the upper-side printed layer 33 is formed on from the left-side printed layer 31 over the right-side printed layer 32 through the upper-side region 253, the upper-side printed layer 33 can be reliably formed at the boundaries between the left-side region 251 and the upper-side region 253, and between the right-side region 252 and the upper-side region 253, and favorable aesthetics can be realized.

Furthermore, in top view (plan view) of the inner edges 316, 326, 336, and 346, the unevenness difference can be set to be 40 μm or smaller and favorable aesthetics can be realized.

Since the thicknesses T32, T33, T42, and T43 of the upper printed layers 332, 333, 342, and 343 are set to be thinner than the thicknesses T31 and T41 of the upper-side single-layer portion 331 and the lower-side single-layer portion 341, when the printed layers 31 to 34 are observed from the first main surface 21 side of the plate 1 with a printed layer, the alignment marks and the like having high contrast can be obtained. Furthermore, the step formed by the thicknesses T32, T33, T42, and T43 can be reduced. A favorable final product can be obtained without generating a void and the like when, for example, an adhesion layer is bonded in the next step.

Modification Example

The present invention is not limited only to the above-described embodiment, and various modifications, various design changes and the like can be made within a range not departing from the gist of the present invention. Regarding the specific procedure, the structure, and the like when the present invention is realized, other structures and the like may be employed in a range in which the object of the present invention can be achieved.

Figure 9A:
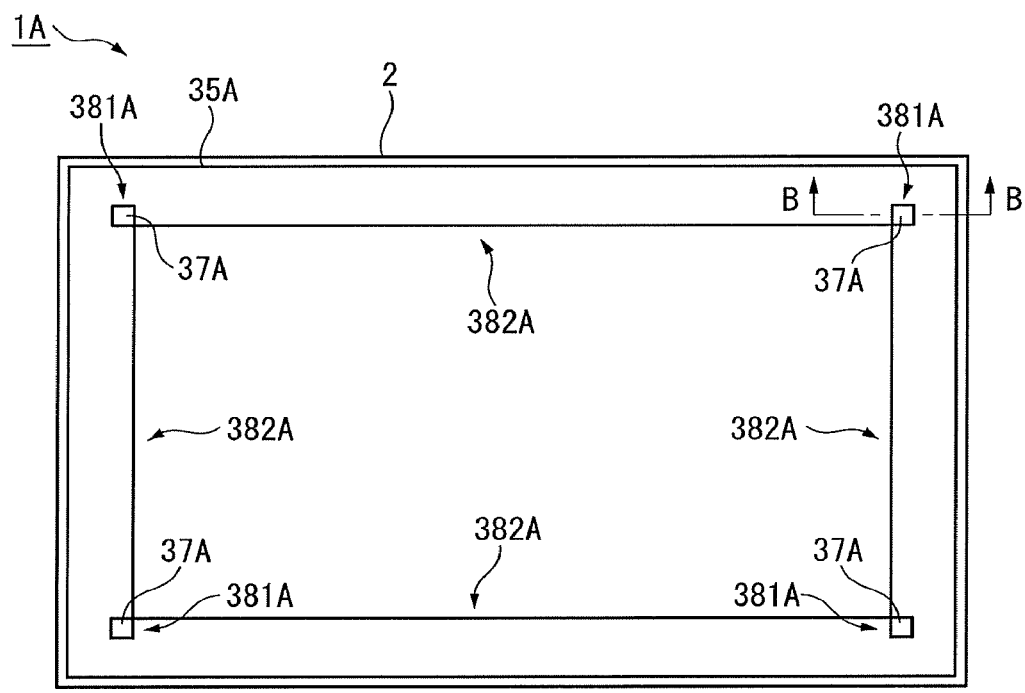
FIG. 9A is a plan view illustrating a plate with a printed layer according to a modification example of the present invention.
Figure 9B:
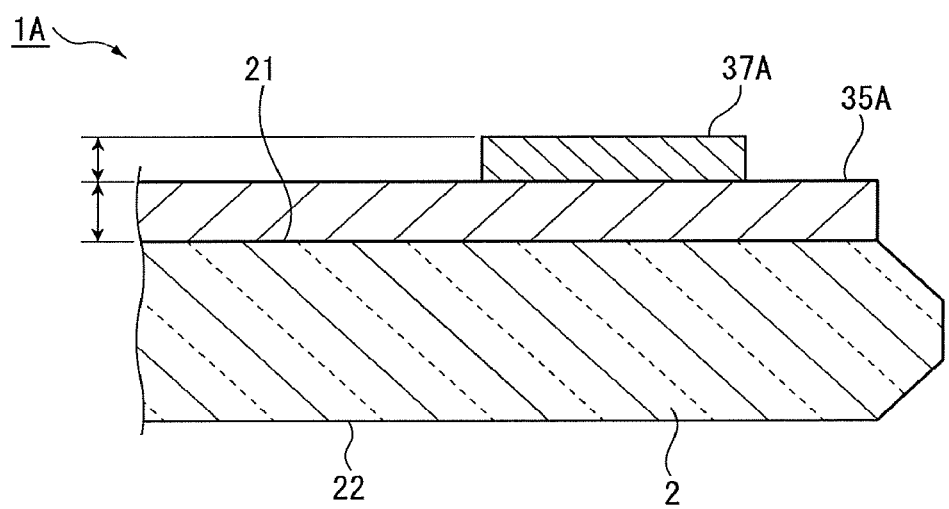
FIG. 9B is a sectional view taken along line B-B.

For example, a plate 1A with a printed layer as illustrated in FIG. 9A and FIG. 9B may be employed. The plate 1A with a printed layer includes a lower printed layer 35A provided in the circumferential region of the bent plate 2 on the first main surface 21 to have a square frame shape, and four upper printed layers 37A. The upper printed layers 37A are provided at four corners of the inner edges of the lower printed layer 35A, respectively. A multi-layer portion 381A is configured by the upper printed layer 37A and a portion of the lower printed layer 35A, at which the upper printed layer 37A is provided. A single-layer portion 382A is configured by a portion of the lower printed layer 35A, at which the upper printed layer 37A is not provided.

Such a plate 1A with a printed layer can be manufactured by printing the lower printed layer 35A having a square frame shape and then printing the upper printed layer 37A. The printing method of the lower printed layer 35A and the upper printed layer 37A may be the same as or different from each other. For example, a screen print method or an ink jet method may be used.

With such a plate 1A with a printed layer, contrast can be also imparted by the difference in thickness between the multi-layer portion 381A and the single-layer portion 382A even in the case of using a single ink. Although FIG. 9A and FIG. 9B illustrate the plate 1A with a printed layer having a flat plate shape, in practice, the plate 1A with a printed layer is bent similar to the plate 1 with a printed layer in the above-described embodiment.

For example, plates which have various shapes or are formed of various materials can be used as the bent plate 2 of the plates 1 and 1A with a printed layer, depending on the use.

Regarding the shape, a plate having only a flat portion, a plate having both a flat portion and a bent portion, or a plate having an unevenness on the surface may be provided. The bent plate is not limited to a plate and may have a film or sheet shape.

Regarding the material, the material may be transparent. General glass, for example, inorganic glass or organic glass such as polycarbonate and acrylic glass can be used. In addition, other synthetic resins and the like can also be used. A composite of glass and resin such as laminated glass can also be used.

In the case where inorganic glass is used as the bent plate 2, the thickness t thereof is preferably from 0.5 mm to 5 mm. If the glass has a thickness of the lower limit value or greater, there is an advantage of obtaining a plate 1 with a printed layer having high strength and favorable texture. In the case using inorganic glass, the thickness t thereof is more preferably from 0.7 mm to 3 mm and further preferably from 1 mm to 3 mm.

In the case of the bent plate 2 having a bent portion, the curvature radius of the bent portion is 10,000 mm or smaller, preferably 5,000 mm or smaller, more preferably 1,000 mm or smaller, and further preferably 200 mm or smaller. Even in the case of the bent plate 2 having a small curvature radius in which uniform printing has not been possible by a conventional method, uniform printing can be performed and a uniform plate 1 with a printed layer can be obtained by using a printing method with the ink jet method according to the above-described embodiment. The curvature radius of the bent portion is preferably 1 mm or greater, more preferably 5 mm or greater, and further preferably 10 mm or greater. If the curvature radius of the bent portion is the lower limit value or greater, it is difficult to buffer the ink and a more uniform printed layer can be obtained.

In the case of the bent plate 2 having a bent portion, the bending depth of the bent portion may be 1,000 mm or smaller, preferably 800 mm or smaller, more preferably 500 mm or smaller, and further preferably 200 mm or smaller. If the bent plate 2 has a bending depth of the upper limit value or smaller, even in the case of the bent plate 2 which has a bent portion having a deep bending depth in which uniform printing has not been possible by a conventional method, uniform printing can be performed and a uniform plate 1 with a printed layer can be obtained by using a printing method with the ink jet method according to the above-described embodiment. The bending depth of the bent portion is not particularly limited. The bending depth is preferably 3 mm or greater, more preferably 5 mm or greater, further preferably 10 mm or greater, and particularly preferably 20 mm or greater. As for the bent plate 2 which has a small bending depth of the lower limit value or greater but in which uniform printing is not possible by a conventional screen printing method and the like, a uniform plate with a printed layer can be obtained by using the printing method according to the present invention.

Regarding the bent plate 2 to be used, the upper limit of the bending angle thereof is not particularly limited so long as the upper limit is smaller than 360°. The upper limit thereof is preferably 270° or smaller, more preferably 180° or smaller, further preferably 135° or smaller, particularly preferably 120° or smaller, and more particularly preferably 90° or smaller. Conventionally, uniform printing on such a bent plate 2 having a large bending angle has not been possible. However, in the printing method with the ink jet method in the above-described embodiment, a uniform printed layer can be formed since the nozzles for discharging the ink can be brought close and thus, a uniform plate 1 with a printed layer can be obtained. The lower limit of the bending angle is preferably 30° or greater and more preferably 45° or greater.

In the case where organic glass, synthetic resin or the like is used for the bent plate 2, the bent plate 2 may be configured of base materials which are superposed regardless of the type of the materials, and various adhesive layers may be inserted between the base materials.

In the case where inorganic glass is used as the bent plate 2, any of a chemical strengthening treatment and a physical strengthening treatment may be performed, and the chemical strengthening treatment is preferably performed. As described above, in the case where relatively thin inorganic glass is subjected to a strengthening treatment, the chemical strengthening treatment is appropriate.

An antiglare treatment (AG treatment), an antireflection treatment (AR treatment), an anti-fingerprint treatment (AFP treatment), and the like are preferably performed on at least one surface of the first main surface 21 and the second main surface 22 of the bent plate 2. A primer treatment, an etching treatment or the like may be performed on the first main surface 21 on which the printed layers 31 to 34 and 35A are provided and on the chamfered portion 24, in order to improve adhesiveness to the printed layers 31 to 34 and 35A.

Inks for forming the printed layers 31 to 34, 35A, and 37A may be inorganic or organic. As the inorganic ink, for example, a composition containing one kind or more selected from $SiO_2$, ZnO, $B_2O_3$, $Bi_2O_3$, $Li_2O$, $Na_2O$, and $K_2O$, one kind or more selected from CuO, $Al_2O_3$, $ZrO_2$, $SnO_2$, and $CeO_2$, and $Fe_2O_3$ and $TiO_2$ may be employed.

As the organic ink, various print materials in which resin is dissolved in a solvent can be used. For example, as the resin, at least one kind may be selected and used from the group consisting of resins such as acrylic resin, urethane resin, epoxy resin, polyester resin, polyamide resin, vinyl acetate resin, phenol resin, olefin, ethylene-vinyl acetate copolymer resin, polyvinyl acetal resin, natural rubber, styrene-butadiene copolymer, acrylonitrile-butadiene copolymer, polyester polyol, and polyether polyurethane polyol.

As the solvent, water, alcohols, esters, ketones, aromatic hydrocarbon solvents, and aliphatic hydrocarbon solvents may be used. For example, as the alcohols, isopropyl alcohol, methanol, ethanol, and the like can be used. As the esters, ethyl acetate can be used. As the ketones, methyl ethyl ketone can be used. As the aromatic hydrocarbon solvent, toluene, xylene, SOLVESSO™ 100, SOLVESS™ 150, and the like can be used. As the aliphatic hydrocarbon solvent, hexane and the like can be used. The above materials are just an example. In addition, various print materials can be used. After the organic print material is applied onto a transparent plate, the solvent may be evaporated. Thus, the printed layers 31 to 34, 35A, and 37A made of resin can be formed. A thermosetting ink which can be cured by heating may be employed and a UV curable ink may also be employed. It is not particularly limited.

The printed layers 31 to 34, 35A, and 37A may be formed by pad printing or film transfer printing.

Pad printing is a method in which the bent plate 2 is positioned and fixed based on an origin point of a pad moving mechanism as a reference, and a predetermined pattern formed on a printing plate surface is transferred to the bent plate 2 by using an elastic pad. The pad is brought into contact with the printing plate and transfers the predetermined pattern which has been formed on the printing plate in advance, onto a pad surface. Then, the pad is brought into contact with a printing target surface of the bent plate 2, and thus the pattern on the pad surface is transferred to the bent plate 2, thereby forming the printed layer on the bent plate 2. Followability to the shape of the surface in transferring can be improved by using a material having relative low modulus of elasticity, for example, silicon rubber, as the material of the pad, and using for a relatively steep bent plate is also possible.

In film transfer printing, a transfer target layer (printed layer) having a predetermined pattern is formed on a film. The film is brought into contact with a printing target surface of the bent plate 2 so as to transfer the transfer target layer formed on the film onto the bent plate 2. Then, the film is removed and thus the printed layer is formed on the bent plate 2. As the film material, a material having flexibility which can follow the shape of the printing target surface of the bent plate 2 is preferable. When the film is brought into contact with the printing target surface of the bent plate 2, if necessary, the positioning of the film is performed. When the transfer target layer is transferred onto the bent plate 2, means such as pressurization by a rubber roll or heating may be auxiliary performed.

The ink used for the printed layers 31 to 34, 35A, and 37A may include a colorant. Regarding the colorant, for example, in the case where the printed layers 31 to 34, 35A, and 37A are formed to be black, a black colorant such as carbon black can be used. In addition, an appropriate color colorant in accordance with a desired color can be used.

Regarding printing of at least one of the printed layers 31 to 34, 35A, and 37A, stacking may be performed a desired number of times. Regarding the ink used in printing, different inks may be used for the layers.

Different inks may be used for the printed layers 31 to 34, 35A, and 37A.

In the case where the printed layers 31 to 34, 35A, and 37A are stacked a desired number of times, different inks may be used for the layers. For example, in the case where the printed layers 31 to 34, 35A, and 37A are desired to be viewed white when a user views the plate 1 with a printed layer from the second main surface 22 side, the first layer may be printed with white and the second layer and the subsequent layers may be printed with black. Thus, when a user views the printed layers 31 to 34, 35A, and 37A from the second main surface 22 side, white printed layers 31 to 34, 35A, and 37A in which the so-called "translucency" relating to visibility of the back surface of the printed layers 31 to 34, 35A, and 37A is suppressed can be formed.

The printed layer may have an L-shape along two continuing sides of the first main surface 21 or a U-shape along three sides, so as to have the single-layer portion and the multi-layer portion as in the above-described embodiment. In the case where the first main surface 21 has a polygon other than a quadrangle, or has a circle or an irregular shape, the printed layer may be provided to have a frame shape corresponding to the respective shape or a linear shape along a plurality of lines of a polygon, such that the printed layer has the single-layer portion and the multi-layer portion. In the case where the first main surface has a circular shape, the printed layer may be set to have the single-layer portion and the multi-layer portion by overlapping end portions of a plurality of arc-shaped printed layers.

The printed layers 31 to 34, 35A, and 37A may be dried or fired after each of the printed layers 31 to 34, 35A, and 37A is formed. A timing, a temperature condition or the like for performing the steps can be appropriately selected in accordance with the characteristics of an ink to be used.

When the plate 1 with a printed layer is manufactured, printing of the left-side printed layer 31 and the right-side printed layer 32 may be performed simultaneously by using a plurality of nozzles. Printing of the upper-side printed layer 33 and the lower-side printed layer 34 may be simultaneously performed.

Only at least one of the multi-layer portions 361 to 364 may be provided.

The sizes of the multi-layer portions 361 to 364 in plan view may be equal to each other.

The entirety of the upper surfaces of the upper printed layers 332, 333, 342, and 343 may be parallel to the first main surface 21 or at least some may be inclined from the first main surface 21.

The shape of the upper surfaces of the upper printed layers 332, 333, 342, and 343 may have a polygon other than a quadrangle, or may have a circle or an irregular shape.

The usage of the plates 1 and 1A with a printed layer in the present invention is not particularly limited. Specific examples thereof include transparent components for vehicles (headlight cover, side mirror, front transparent board, side transparent board, rear transparent board, instrument panel surface, etc.), a meter, a building window, a show window, a building interior member, a building exterior member, a display (notebook type personal computer, monitor, LCD, PDP, ELD, CRT, PDA, etc.), an LCD color filter, a touch panel substrate, a pickup lens, an optical lens, a spectacle lens, camera components, video components, a CCD cover board, an optical fiber end face, a projector component, copier components, a solar cell transparent substrate (cover glass, etc.), a portable phone window, backlight unit components (light guide plate, a cold cathode tube, etc.), a liquid crystal brightness enhancement film for the backlight unit component (prism, semi-transparent film, etc.), a liquid crystal brightness enhancement film, organic EL light emitting element components, inorganic EL light emitting element components, fluorescent light emitting element components, an optical filter, an end surface of an optical component, an illumination lamp, a cover for lighting equipment, an amplified laser light source, an antireflection film, a polarizing film, and an agricultural film.

The printed layers 31 to 34, 35A, and 37A of the plates 1 and 1A with a printed layer in the present invention may constitute the pattern of an article in which the plates 1 and 1A with a printed layer is used, to improve the design of the article.

In particular, the plate 1 with a printed layer in the present invention is suitable to an interior member for transportation machines. The multi-layer portion of the printed layer in the present invention may be formed at a portion of the bent plate 2, at which light is not desired to be transmitted. Thus, in the case where a display device such as a liquid crystal panel or a sensor is disposed in the display region 4, it is difficult to leak light of a backlight used in the display device or the sensor from the printed layer. Thus, for example, when a driver operates the display device or the sensor, the driver easily performs instantaneous determination. In the transportation machines such as automobiles, since the brightness normally changes, the plate 1 with a printed layer of the present invention is particularly suitable. As the interior member for the transportation machines, it is appropriate that the plate 1 with a printed layer in the present invention is used for a dashboard (instrument panel, head up display (HUD), center console) or a non-opening interior member (a door, a seat, a floor, a ceiling, a handle).

Here, an example of a display device including the plate 1 with a printed layer will be described.

Figure 10:
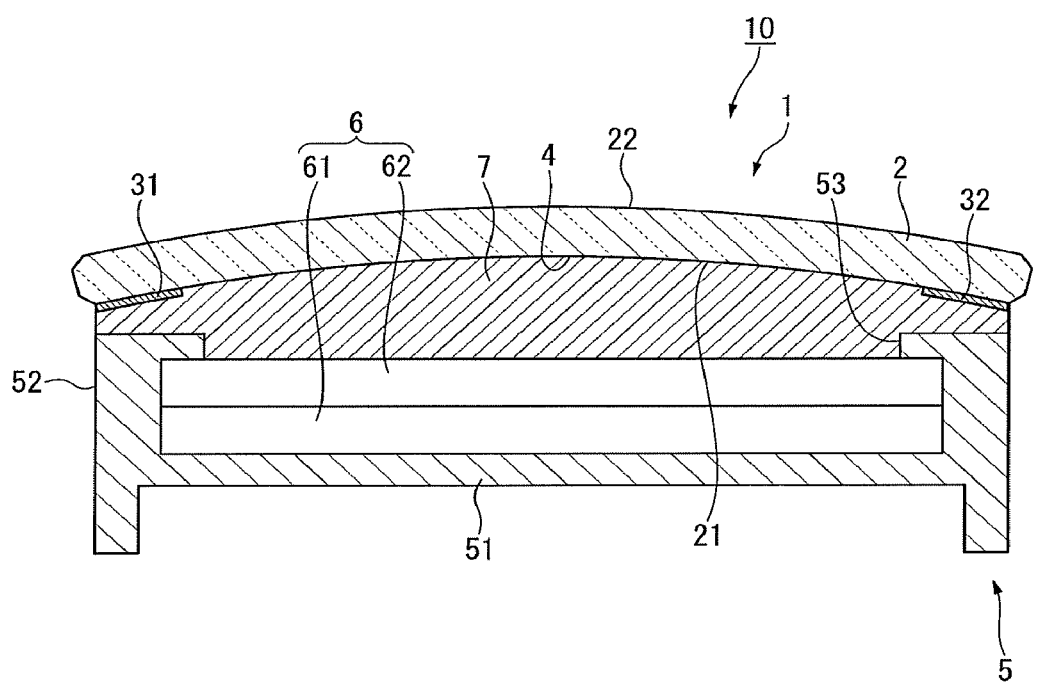
FIG. 10 is a sectional view illustrating a display device including the plate with a printed layer in the present invention.

A display device 10 illustrated in FIG. 10 includes a frame 5. The frame 5 includes a bottom portion 51, a side wall portion 52 intersecting with the bottom portion 51, and an opening portion 53 facing the bottom portion 51. A liquid crystal module 6 is disposed in a space surrounded by the bottom portion 51 and the side wall portion 52. The liquid crystal module 6 includes a backlight 61 disposed on the bottom portion 51 side and a liquid crystal panel (display panel) 62 disposed on the backlight 61.

A plate 1 with a printed layer functioning as a cover member is provided at the upper end of the frame 5 so as to cause the first main surface 21 to be directed to the liquid crystal module 6 side. In the plate 1 with a printed layer, a portion of the printed layers 31 to 34 is bonded to the frame 5 and the remaining portion of the printed layers 31 to 34 and the display region 4 of the first main surface 21 are bonded to the liquid crystal module 6, through an adhesive layer 7 provided on the upper end surface of the opening portion 53 and the side wall portion 52.

The adhesive layer 7 is preferably transparent similar to the bent plate 2. A difference in refractive index between the adhesive layer 7 and the bent plate 2 is preferably small.

Examples of the adhesive layer 7 include a layer made of transparent resin obtained by curing a liquid curable resin composition. Examples of the curable resin composition include a photocurable resin composition and a thermosetting resin composition. Among the compositions, the photocurable resin composition including a curable compound and a photopolymerization initiator is preferable. Coating with the curable resin composition may be performed by using a method of, for example, a die coater and a roll coater, thereby forming a curable-resin composition film.

The adhesive layer 7 may be an OCA film (OCA tape). In this case, the OCA film may be bonded to the first main surface 21 side of the plate 1 with a printed layer.

The thickness of the adhesive layer 7 is preferably from 5 μm to 400 μm and more preferably from 50 μm to 200 μm. The storage shear modulus of elasticity of the adhesive layer 7 is preferably from 5 kPa to 5 MPa and more preferably from 1 MPa to 5 MPa.

When the display device 10 is manufactured, an assembling order is not particularly limited. For example, a structure in which the adhesive layer 7 has been disposed in the plate 1 with a printed layer may have been prepared in advance, and the structure may be disposed on the frame 5, and then the liquid crystal module 6 may be bonded.

The display device 10 may include a touch sensor and the like. In the case where the touch sensor is assembled, the touch sensor may be disposed on the first main surface 21 of the plate 1 with a printed layer through the adhesive layer, and the liquid crystal module 6 may be disposed on the resultant through the adhesive layer 7.

When such a display device 10 is manufactured, positioning of the plate 1 with a printed layer on the frame 5 as a casing is difficult. However, the positioning is easily performed by using the first to fourth multi-layer portions 361 to 364 as the alignment marks and the like.

As the display panel, an organic EL (electroluminescence) panel, or a plasma display panel may be provided.

EXAMPLES

Next, an example of the present invention will be described. The present invention is not limited to the following examples. Example 1 is Example of the present invention and Example 2 is Comparative example.

A glass plate with a printed layer was obtained in the following procedure by using, as a plate, a plate-shaped glass (Dragontrail (registered trademark) ) before chemical strengthening, manufactured by Asahi Glass Co., Ltd) having a thickness of 2 mm, a size of 540 mm×450 mm in plan view, and a quadrangular main surface.

Example 1

The following steps were performed on the glass plate in an order of (1) forming step, (2) grinding step of an end surface, (3) chemical strengthening treatment and alkali treatment, and (4) forming a printed layer. Specific steps are as follows.

(1) Forming Step

A recess portion was formed in the first main surface 21 of plate-shaped glass by forming step in the following procedure.

First, each of both surfaces of the plate-shaped glass was polished with a cerium oxide polishing liquid by 3 μm. Then, after washing was performed, the glass plate was dried. The plate-shaped glass was placed on a mold and the temperature of the mold was increased up to about 750° C. Thus, the glass plate was softened and was fit into the mold. The bent portion of the mold was transferred, and thus, as illustrated in FIG. 2B, the curvature radius R1 of one end of the bent portion 2A of the plate-shaped glass was set to be 70 mm, the curvature radius R2 of the other end was set to be 25 mm, and the bending depth of the bent portion 2A was set to be 50 mm. The plate-shaped glass to which the bent portion 2A had been formed was gradually cooled to room temperature, thereby obtaining a plate-shaped glass having a bent portion (in this Example, simply referred to as "bent glass 2" below). The bent glass 2 has a flat portion 2B. Regarding the size of the flat portion 2B on the second main surface side, a1=130 mm, a2=250 mm, a3=120 mm, and a4=350 mm.

(2) Grinding Step of End Surface

C chamfering was performed over the entire circumference of the bent glass 2 with a dimension of 0.2 mm from the end surface of the glass. Chamfering was performed with a grindstone of No. 600 (manufactured by Tokyo Diamond Co., Ltd.) at a rotation speed of the grindstone of 6,500 rpm and a moving speed of the grindstone of 5,000 mm/min. Thus, the arithmetic surface roughness Ra of the end face was 450 nm.

(3) Chemical Strengthening Treatment and Alkali Treatment

Then, the chemical strengthening treatment was performed in a manner that the bent glass 2 was immersed in a molten salt obtained by heating a potassium nitrate salt to 450° C. so as to melt, for two hours. Then, the glass plate was pulled up from the molten salt and was slowly cooled to room temperature for one hour. With the above step, the bent glass 2 having a surface compressive stress (CS) of 730 MPa and a depth of a stress layer of 25 μm was obtained. The obtained bent glass 2 was immersed in an alkaline solution (product name: Sunwash TL-75, manufactured by Lion Corporation) for four hours, thereby performing an alkali treatment.

(4) Forming of Printed Layer by Ink Jet Method

Figure 11:
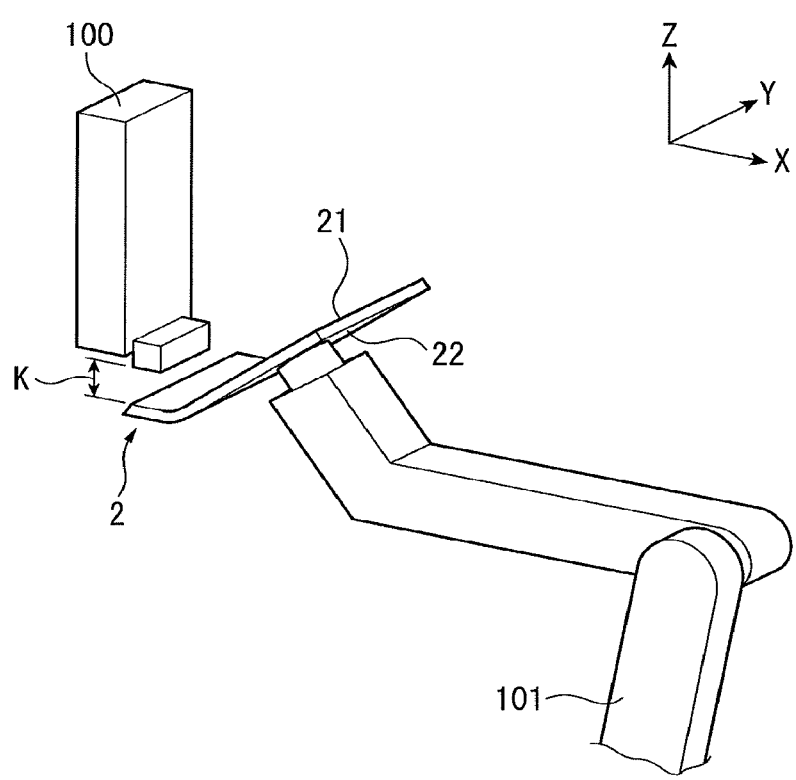
FIG. 11 is a perspective view illustrating an ink jet device used in Examples of the present invention.

The printed layer was formed by using an ink jet device. FIG. 11 illustrates a configuration of the inkjet device. An ink jet nozzle 100 (manufactured by Xaar Corporation, model number of #1001) was fixed to a cradle. A discharge port of the inkjet nozzle 100 was set to direct downward so that an ink was applied in the vertical direction (downward direction (−Z direction) in FIG. 11). Regarding the bent glass 2, the second main surface 22 was gripped by a six-axis articulated robot 101 (model number RV-7FL manufactured by Mitsubishi Electric Corporation), and the first main surface 21 was set as a printing surface. The position or the angle of the bent glass 2 was adjusted by controlling the six-axis articulated robot 101 such that the distance K between the discharge port of the ink jet nozzle 100 and the first main surface 21 was from 0.8 mm to 2 mm and a normal direction of the first main surface 21 and a discharge direction (at this time, vertical direction) of the ink jet nozzle 100 are on the substantially same straight line (on the substantially same plane). A thermosetting black ink was used as the ink.

First, before a printed layer was formed, corona treatment was performed on the first main surface 21 of the bent glass 2 for 1 to 30 seconds, and thus a contact angle of the first main surface 21 with water was set to be 5° or smaller. Then, printing started, and thus the left-side printed layer 31 was formed on the left-side region 251A in the first main surface 21 illustrated in FIG. 2B. At this time, the bent glass 2 was moved with respect to the ink jet nozzle at a speed of 10 mm/s. An average thickness T10 of the left-side printed layer 31 was set to 3.5 μm. Similarly, the right-side printed layer 32 was formed in the right-side region 252A and the average thickness T20 of the right-side printed layer 32 was set to 3.5 μm.

The upper-side printed layer 33 was formed in the upper-side region 253A illustrated in FIG. 2B. Printing of the upper-side printed layer 33 started from on the right-side printed layer 32 and the printing was performed onto the left-side printed layer 31. At this time, since the bent portion 2A having a curvature radius R2 was provided in a printed layer forming direction, the bent glass 2 was moved with respect to the discharge port of the ink jet nozzle 100, while rotating. In the upper-side printed layer 33, the average thickness T33 of the printed layer formed on the right-side printed layer 32 was set to 1.5 μm, the average thickness T32 of the printed layer formed on the left-side printed layer 31 was set to 1.5 μm, and the average thickness T31 of the printed layer formed on the first main surface 21 was set to 3.5 μm. At this time, the bent glass 2 was moved with respect to the ink jet nozzle 100 at a speed of 10 mm/s in the flat portions 2B and 2C, and moved along a bent surface at 5 mm/s in the bent portion 2A.

Finally, the lower-side printed layer 34 was formed in the lower-side region 254A illustrated in FIG. 2B. Printing of the lower-side printed layer 34 started from on the right-side printed layer 32, and the printing was performed onto the left-side printed layer 31. At this time, since the bent portion 2A having a curvature radius R1 was provided in a printed layer forming direction, the bent glass 2 was moved with respect to the discharge port of the ink jet nozzle 100, while rotating. In the lower-side printed layer 34, the average thickness T42 of the printed layer formed on the right-side printed layer 32 was set to 1.5 μm, the average thickness T43 of the printed layer formed on the left-side printed layer 31 was set to 1.5 μm, and the average thickness T41 of the printed layer formed on the first main surface 21 was set to 3.5 μm. At this time, the bent glass 2 was moved with respect to the ink jet nozzle 100 at a speed of 5 mm/s in the flat portions 2B and 2C and moved along a bent surface at 5 mm/s in the bent portion 2A.

The bent glass 2 on which the printed layers were formed on the four sides was dried and fired at 220° C. for 20 minutes. After cooling, a glass plate A with a printed layer including a single-layer portion and a multi-layer portion was obtained.

The ratio α of the thicknesses T10, T20, T31, and T41 of the printed layer (single-layer portion) formed on the first main surface 21 to the thickness of the multi-layer portion was 0.7 as calculated from 3.5 μm/(1.5 μm+3.5 μm).

Example 2

The following steps were performed on a glass plate in an order of (1) preparation of glass, (2) grinding step of an end surface, (3) chemical strengthening treatment and alkali treatment, and (4) forming a printed layer. Example 2 is different from Example 1 except for (2) and (3). In (4) a step of forming a printed layer, a printed layer was formed not by the ink jet printing method but by a screen printing method. Since printing of the bent portion 2A of the above-described bent glass 2 was not possible by the screen printing method, the forming step was not performed in (1) and a flat plate-shaped glass was used. Specific steps are as follows.

(1) Preparation of Glass

Each of both surfaces of the plate-shaped glass was polished with a cerium oxide polishing liquid by 3 μm. Then, after washing, drying was performed, thereby obtaining a glass plate.

(4) Forming of Printed Layer by Screen Printing Method

The lower printed layer 35A was formed at an outer circumferential portion of the first main surface 21 of the glass plate so as to have a black frame shape having a width of 2 cm. First, a mesh screen plate of #320 was set on a screen printing machine. The used screen plate was produced so that the wettability of the emulsion portion with respect to the ink was different from that of the mesh portion. A black ink (product name: HF GV3RX01 710 Black, manufactured by Seiko Advance Co., Ltd.) was prepared as an ink. Then, the black ink was applied to have an average thickness of 5 μm by using the screen printing machine, thereby forming the lower printed layer 35A. Then, the lower printed layer 35 was dried by being held at 120° C. for 10 minutes.

The upper printed layer 37A as illustrated in FIG. 9 was formed on the inner circumference side of the lower printed layer 35A. Specifically, first, a mesh screen plate of #320 was set on a screen printing machine. The used screen plate was produced so that the wettability of the emulsion portion with respect to the ink was different from that of the mesh portion. A black ink (product name: HF GV3RX01 710 Black, manufactured by Seiko Advance Co., Ltd.) was prepared as an ink. Then, the black ink was applied by using the screen printing machine, such that an average thickness at the edge of the upper printed layer 37A was 5 µm, thereby forming the upper printed layer 37A. Then, the upper printed layer 37A was fired by being held at 120° C. for 30 minutes. With the above procedure, a glass plate B with a printed layer having a single-layer portion and a multi-layer portion was obtained.

A ratio α of the thickness of the lower printed layer 35A (single-layer portion) formed on the first main surface 21 to the thickness of the multi-layer portion was 0.5 as calculated from 5 µm/(5 µm+5 µm).

Evaluation

The glass plates with a printed layer obtained in Examples 1 and 2 were evaluated as follows.

Optical Microscopy Observation

Regarding the outer edge of the printed layer (boundary between the printed layer and the first main surface 21 on which the printed layer was not formed), the unevenness difference was estimated by an optical microscope in order to confirm the degree of different from the design value. As the optical microscope, a semiconductor/FPD optical microscope (model number: MX61LT-N1277MU2, manufactured by Olympus Corporation) was used and observation was performed in a reflection mode. The observation magnification was 50 times. Table 1 shows results. The unevenness difference was defined as a distance between the most protruding portion and the most recessed portion in the end surface of the printed layer in the observation field of view. The unevenness difference was obtained as an average of the results of measurement at three places.

TABLE 1

|  | Glass plate with printed layer | |
|---|---|---|
|  | A | B |
| Unevenness difference (µm) | 20 | 50 |

Contrast Confirmation

Regarding the printed layer of each of the glass plates A and B with a printed layer, contrast between the multi-layer portion and the single-layer portion was confirmed from the first main surface side. It was also confirmed whether a difference in color between the multi-layer portion and the single-layer portion was recognized or not, from the second main surface.

Adhesion Test

Regarding the glass plates A and B with a printed layer, an adhesive was applied on the first main surface to cover the printed layer and the region in which the printed layer was not formed. A glass plate (described as a display panel below) having a thickness of 10 mm as an alternative to a display panel was bonded to each of the glass plates A and B with a printed layer through the adhesive layer.

Visibility Test after Bonding

A flat plate-shaped illumination was applied to the samples produced in the adhesion test, from the back surface of the glass plate as an alternative to the display panel. The samples were visually recognized from the second main surface of the glass plates A and B with a printed layer, and then the printed layer of each of the glass plates A and B was observed.

When the printed layer of the glass plate A with a printed layer was observed from the first main surface, contrast between the multi-layer portion and the single-layer portion could be confirmed, and the difference in color was not confirmed even though being observed from the second main surface. On the other hand, when the printed layer of the glass plate B with a printed layer was observed from the first main surface, contrast between the multi-layer portion and the single-layer portion could be confirmed, but the difference in color was confirmed when observed from the second main surface.

Regarding the glass plate A with a printed layer, even though the adhesive was applied, a step between the single-layer portion and the multi-layer portion was small and an occurrence of a step by the adhesive was also rare. There was no gap with the display panel and bonding could be performed without backlash. Regarding the glass plate B with a printed layer, the step between the single-layer portion and the multi-layer portion was large and a large step could also be provided at the adhesive. When a display panel was bonded to the glass plate B with a printed layer, defects such as forming of a gap were observed. When adjustment was performed such that a step did not occur in the adhesive, backlash due to uneven thickness of the adhesive was observed.

When the flat plate-shaped illumination was placed on the back surface of the display panel and the glass plate A with a printed layer was observed from the second main surface, light transmitted due to the defect of the printed layer itself was not confirmed. Regarding the outer edge of the printed layer, favorable linearity was confirmed with matching with the result of the optical microscopy observation. On the other hand, regarding the glass plate B with a printed layer, light was partially transmitted by the printed layer itself, and the light shielding property was poor. Regarding the outer edge of the printed layer, linearity as much as the glass plate A with a printed layer was not confirmed.

From the above results, in the glass plate with a printed layer in Example of the present invention, in comparison to the glass plate with a printed layer in Comparative Example, contrast could be recognized only when the printed layer was observed from the first main surface side. In the case where the printed layer was visually recognized from the second main surface side through the glass, a difference in color was not visually recognized. From the above, a glass plate with a printed layer which had functionality and excellent aesthetic appearance was obtained.

The present application is based on Japanese Patent Application No. 2017-101359, filed on May 23, 2017, the entire content of which is incorporated herein by reference.

DESCRIPTION OF REFERENCE NUMERALS AND SIGNS 1, 1A PLATE WITH A PRINTED LAYER (COVER MEMBER)
2 PLATE
4 DISPLAY REGION
5 FRAME (CASING)
7 ADHESIVE LAYER
10 DISPLAY DEVICE
21 FIRST MAIN SURFACE
31 LEFT-SIDE PRINTED LAYER (FIRST PRINTED LAYER)

32 RIGHT-SIDE PRINTED LAYER (FIRST PRINTED LAYER)
33 UPPER-SIDE PRINTED LAYER (SECOND PRINTED LAYER)
34 LOWER-SIDE PRINTED LAYER (SECOND PRINTED LAYER)
35, 35A LOWER PRINTED LAYER
37A UPPER PRINTED LAYER
62 LIQUID CRYSTAL PANEL (DISPLAY PANEL)
316 INNER EDGE
326 INNER EDGE
336 INNER EDGE
346 INNER EDGE
251 LEFT-SIDE REGION (FIRST REGION)
252 RIGHT-SIDE REGION (FIRST REGION)
253 UPPER-SIDE REGION (SECOND REGION)
254 LOWER-SIDE REGION (SECOND REGION)
313 LEFT-SIDE SINGLE-LAYER PORTION
323 RIGHT-SIDE SINGLE-LAYER PORTION
331 UPPER-SIDE SINGLE-LAYER PORTION
341 LOWER-SIDE SINGLE-LAYER PORTION
332, 333, 342, 343 FIRST TO FOURTH UPPER PRINTED LAYERS
361, 362, 363, 364 FIRST TO FOURTH MULTI-LAYER PORTIONS
381A MULTI-LAYER PORTION
382A SINGLE-LAYER PORTION

What is claimed is:

1. A plate with a printed layer, comprising:
a plate having a bent portion;
a first printed layer formed on a surface of the plate such that the first printed layer includes a lower portion formed in the bent portion of the plate; and
a second printed layer including a single-layer portion formed on the surface of the plate and an upper portion formed on the lower portion of the first printed layer in the bent portion of the plate.

2. The plate with a printed layer according to claim 1, wherein the second printed layer is formed such that the upper portion of the second printed layer has a thickness that is less than a thickness of the single-layer portion of the second printed layer on the surface of the plate.

3. The plate with a printed layer according to claim 1, wherein the first printed layer is formed in a plurality, and the second printed layer is formed in a plurality such that a plurality of second printed layers includes the upper portion formed in a plurality.

4. The plate with a printed layer according to claim 3, wherein the plurality of upper portions of the plurality of second printed layers is formed such that the upper portions include a plurality of sets of upper portions having different sizes from each other.

5. The plate with a printed layer according to claim 1, wherein the upper portion of the second printed layer has a thickness in a range of from 0.5 μm to 8 μm.

6. The plate with a printed layer according to claim 1, wherein the first and second printed layers are formed such that a ratio of a thickness of the single-layer portion of the second printed layer to a thickness of a multi-layer portion formed of the lower portion of the first printed layer and the upper portion of the second printed layer is 0.6 or greater and that a ratio of a thickness of the first printed layer to the thickness of the multi-layer portion is 0.6 or greater.

7. The plate with a printed layer according to claim 1, wherein the first printed layer is formed such that the lower portion has unevenness at an outer edge of the lower portion in a plan view such that a difference between a maximum value and a minimum value of the unevenness is 40 μm or smaller.

8. The plate with a printed layer according to claim 1, wherein the plate is a transparent plate, and the lower portion of the first printed layer is formed at at least a portion of a circumferential region of the surface of the plate.

9. The plate with a printed layer according to claim 1, wherein the plate is glass.

10. The plate with a printed layer according to claim 9, wherein the glass is a tempered glass.

11. A display device, comprising:
a display panel;
the plate of claim 1 such that the plate having the bent portion is a transparent plate; and
an adhesive layer bonding the plate of claim 1 and the display panel.

12. A method for manufacturing a plate with a printed layer, comprising:
forming a first printed layer in a first region on a surface of a plate by an ink jet method, and
forming a second printed layer on the surface of the plate by an ink jet method such that the second printed layer includes an upper portion continuing from a lower portion of the first printed layer to a second region adjacent to the first region on the surface of the plate,
wherein the second printed layer is formed such that a thickness of the upper portion on the lower portion of the first printed layer has a thickness that is less than a thickness of a single-layer portion of the second printed layer in the second region on the surface of the plate.

13. The method according to claim 12, wherein the plate has a bent portion, and the lower portion of the first printed layer is formed on the surface of the plate in the bent portion.

14. The method according to claim 12, wherein the plate has a bent portion, and at least a portion of the first printed layer is formed on the surface of the plate in the bent portion.

15. The plate with a printed layer according to claim 1, wherein the plate is a transparent tempered glass plate, and the lower portion of the first printed layer is formed at at least a portion of a circumferential region of the surface of the plate.

16. The plate with a printed layer according to claim 15, wherein the upper portion of the second printed layer has a thickness in a range of from 0.5 μm to 8 μm.

17. The plate with a printed layer according to claim 15, wherein the first and second printed layers are formed such that a ratio of a thickness of the single-layer portion of the second printed layer to a thickness of a multi-layer portion formed of the lower portion of the first printed layer and the upper portion of the second printed layer is 0.6 or greater and that a ratio of a thickness of the first printed layer to the thickness of the multi-layer portion is 0.6 or greater.

18. The plate with a printed layer according to claim 15, wherein the first printed layer is formed such that the lower portion has unevenness at an outer edge of the lower portion in a plan view such that a difference between a maximum value and a minimum value of the unevenness is 40 μm or smaller.

19. The plate with a printed layer according to claim 7, wherein the first printed layer is formed in a plurality, and the second printed layer is formed in a plurality such that a plurality of second printed layers includes the upper portion formed in a plurality.

20. The plate with a printed layer according to claim 19, wherein the plurality of upper portions of the plurality of second printed layers is formed such that the upper portions include a plurality of sets of upper portions having different sizes from each other.

* * * * *